US008883369B2

(12) United States Patent
Ohmori et al.

(10) Patent No.: US 8,883,369 B2
(45) Date of Patent: Nov. 11, 2014

(54) CONNECTED BODY CONNECTING ELECTRICALLY BETWEEN POWER GENERATION PARTS OF SOLID OXIDE FUEL CELLS

(75) Inventors: Makoto Ohmori, Nagoya (JP); Koichi Koga, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 348 days.

(21) Appl. No.: 13/315,632

(22) Filed: Dec. 9, 2011

(65) Prior Publication Data
US 2012/0164550 A1 Jun. 28, 2012

(30) Foreign Application Priority Data

Dec. 24, 2010 (JP) ................... 2010-288135
Sep. 16, 2011 (JP) ................... 2011-202758
Dec. 8, 2011 (JP) ................... 2011-268512
Dec. 8, 2011 (JP) ................... 2011-268513

(51) Int. Cl.
*H01M 8/02* (2006.01)
*H01M 8/10* (2006.01)
*H01M 8/24* (2006.01)
*H01M 8/12* (2006.01)

(52) U.S. Cl.
CPC .......... *H01M 8/2425* (2013.01); *H01M 8/0217* (2013.01); *Y02E 60/525* (2013.01); *H01M 8/2485* (2013.01); *Y02E 60/521* (2013.01); *H01M 8/1246* (2013.01); *H01M 8/0247* (2013.01)
USPC .......... 429/489; 429/479; 429/465; 429/468; 429/523

(58) Field of Classification Search
USPC ......... 429/456, 483, 484, 486, 491, 479, 489, 429/523, 465, 468
See application file for complete search history.

(56) References Cited

U.S. PATENT DOCUMENTS 6,692,855 B1 2/2004 Aizawa et al.
2006/0147778 A1 7/2006 Matsuzaki et al.
2010/0200421 A1* 8/2010 Aujollet ....................... 205/412

FOREIGN PATENT DOCUMENTS

EP 1 081 778 A1 3/2001
EP 1 603 183 A1 12/2005
EP 2 224 520 A1 9/2010
JP 4-248272 9/1992
JP 8-78041 3/1996

(Continued)

OTHER PUBLICATIONS

Extended European Search Report (Application No. 13184645.3) dated Jun. 18, 2014.

*Primary Examiner* — Kenneth Douyette
(74) *Attorney, Agent, or Firm* — Burr & Brown, PLLC

(57) ABSTRACT

Provided is a connected body connecting electrically between power generation parts of SOFCs, which has high connection strength and high reliability of electric connection. Adjacent two segmented-in-series type SOFCs (100), (100) are connected to each other with a metallic connecting member (300). A "left side end portion of the connecting member (300)" and an "interconnector (30) electrically connected to an air electrode (60) provided on the SOFC (100) on the left side" are electrically connected to each other with a connecting material (80), and a "right side end portion of the connecting member (300)" and the "interconnector (30) electrically connected to a fuel electrode (20) provided on the SOFC (100) on the right side" are electrically connected to each other with the connecting material (80). Both of the interconnectors (30), (30) to be respectively connected to both ends of the metallic connecting member (300) with the connecting material (80) are formed of dense conductive materials.

17 Claims, 20 Drawing Sheets

(56) References Cited

FOREIGN PATENT DOCUMENTS

| | | |
|---|---|---|
| JP | 8-106916 | 4/1996 |
| JP | 11-144752 | 5/1999 |
| JP | 2000-67889 | 3/2000 |
| JP | 2005-174722 | 6/2005 |
| JP | 2005-243528 | 9/2005 |
| JP | 2006-19059 | 1/2006 |
| JP | 2007-66583 | 3/2007 |
| JP | 2007-134230 | 5/2007 |
| JP | 2008-059793 A1 | 3/2008 |
| JP | 4541296 | 7/2010 |
| WO | 99/54946 | 10/1999 |
| WO | 2004/082058 A1 | 9/2004 |

* cited by examiner

CONNECTION PART B

CONNECTION PART A

CONNECTION PART B

CONNECTED BODY CONNECTING ELECTRICALLY BETWEEN POWER GENERATION PARTS OF SOLID OXIDE FUEL CELLS

BACKGROUND OF THE INVENTION

1. Field of the Invention

The present invention relates to a connected body connecting electrically between power generation parts of solid oxide fuel cells.

2. Description of the Related Art

In general, in a solid oxide fuel cell (SOFC), there may be widely adopted a configuration (connected body) in which a fuel electrode side of a power generation part provided in one of adjacent SOFCs is electrically connected to an air electrode side of a power generation part provided in the other of the adjacent SOFCs via a connecting member, in order to obtain a high output voltage.

For example, Japanese Patent Application Laid-open No. 2006-19059 describes, as illustrated in FIGS. 8 and 9 and the like, a connected body in which an interconnector 6 fixed so as to be electrically connected to a fuel electrode 3 (3*a*) of a power generation part provided in one of adjacent SOFCs is electrically connected to an air electrode 5 of a power generation part provided in the other of the adjacent SOFCs via a connecting member 15.

SUMMARY OF THE INVENTION

In the connected body described in the literature, the connecting member 15 and the interconnector 6, and the connecting member 15 and the air electrode 5 are connected to each other, respectively, with a connecting material having electron conductivity. In this case, the connecting member 15 and the interconnector 6 are formed of dense materials, and the air electrode 5 is formed of a porous material.

Therefore, high connection strength and high reliability of electric connection can be realized at a connection part between the connecting member 15 and the interconnector 6 because the dense materials are connected to each other. In contrast, there may arise a problem in that the connection strength and the reliability of electric connection are liable to decrease at a connection part between the connecting member 15 and the air electrode 5 because the materials to be connected include the porous material. A mechanical stress due to an external force and a thermal stress due to temperature distribution are liable to be generated at the respective connection parts. Therefore, there is a demand for development of a connected body having high connection strength and high reliability of electric connection.

The present invention has been made to address the problems, and it is an object of the present invention is to provide a connected body connecting electrically between power generation parts of SOFCs, which has high connection strength and high reliability of electric connection.

A connected body connecting electrically between power generation parts of SOFCs according to the present invention includes: a "first power generation part of a first solid oxide fuel cell including a fuel electrode, an electrolyte film, and an air electrode;" a "second power generation part of a second solid oxide fuel cell including a fuel electrode, an electrolyte film, and an air electrode;" a "first conductive member which is electrically connected to the fuel electrode of the first power generation part and is formed of a dense conductive ceramics having electron conductivity;" a "second conductive member which is electrically connected to the air electrode of the second power generation part and is formed of a dense conductive ceramics having electron conductivity;" and a "metallic connecting member for electrically connecting the first conductive member and the second conductive member."

The connecting member and the first conductive member, and the connecting member and the second conductive member are connected to each other, respectively, with a connecting material having electron conductivity. It should be noted that the connecting member may be a dense body of a conductive ceramics (e.g., a material for an air electrode such as $LaCrO_3$ and LSCF).

According to the configuration described above, both of the first conductive member and the second conductive member to be connected to the metallic connecting member with the connecting material are formed of dense conductive ceramics materials. Thus, there can be provided a connected body having high connection strength and high reliability of electric connection among the connecting member and the first conductive member and the second conductive member.

In the configuration described above, moreover, the first conductive member and the second conductive member may be directly connected to each other with a connecting material having electron conductivity not via the connecting member. Also in this case, both of the first conductive member and the second conductive member to be connected with the connecting material are formed of dense conductive ceramics materials. Thus, there can be provided a connected body having high connection strength and high reliability of electric connection between the first conductive member and the second conductive member.

In this case, in order to ensure the denseness of the conductive ceramics sufficiently, the conductive ceramics suitably has a porosity of 15% or less, more preferably 10% or less, even more preferably 7% or less. As the conductive ceramics, there may be adopted lanthanum chromite (the chemical formula is described later) and titanium oxide (the chemical formula is described later).

As an example of the connected body according to the present invention, there is given a connected body connecting between the adjacent (segmented-in-series type) SOFCs to each other with a connecting member. In this case, the connected body according to the present invention has the following configuration. Namely, the first power generation part and the first conductive member are provided on a porous plate-like support substrate of the first SOFC, the support substrate having formed therein a fuel gas flow channel for allowing a fuel gas to flow therethrough. The second power generation part and the second conductive member are provided on a porous plate-like support substrate of the second SOFC, the support substrate having formed therein a fuel gas flow channel for allowing a fuel gas to flow therethrough. The first SOFC and the second SOFC are electrically connected to each other with the connecting member.

As another example of the connected body according to the present invention, there is given a connected body connecting between both surfaces of one (segmented-in-series type (horizontal stripe type)) SOFC with the connecting member. In this case, the connected body according to the present invention has the following configuration. Namely, the first power generation part and the first conductive member are provided on a first surface side of a porous plate-like support substrate of the SOFC, the support substrate having formed therein a fuel gas flow channel for allowing a fuel gas to flow therethrough. The second power generation part and the second conductive member are provided on a second surface side which is a side opposite to the first surface side of the support substrate. A first surface side and a second surface side of the SOFC are electrically connected to each other with the connecting member.

Meanwhile, in the connected body according to the present invention, the first conductive member may be connected to the fuel electrode of the first power generation part and the second conductive member may be connected to the air electrode of the second power generation part. In general, however, the air electrode (ceramics sintered body) is more fragile than the fuel electrode (ceramics sintered body) because the air electrode is sintered at a lower temperature than the fuel electrode. In this case, therefore, the "connection strength of the second conductive member with respect to the air electrode (i.e., support substrate)" is liable to be lower than the "connection strength of the first conductive member with respect to the fuel electrode (i.e., support substrate)."

From this point of view, the second conductive member is suitably connected to a "conductive ceramics connected to the support substrate having provided thereon the second power generation part, the conductive ceramics being electrically connected to the air electrode of the second power generation part and formed of the same material as the fuel electrode." This allows the connection strength of the second conductive member with respect to the support substrate to be increased as compared to the case where the second conductive member is connected to the air electrode of the second power generation part.

DETAILED DESCRIPTION OF THE INVENTION

Figure 1:
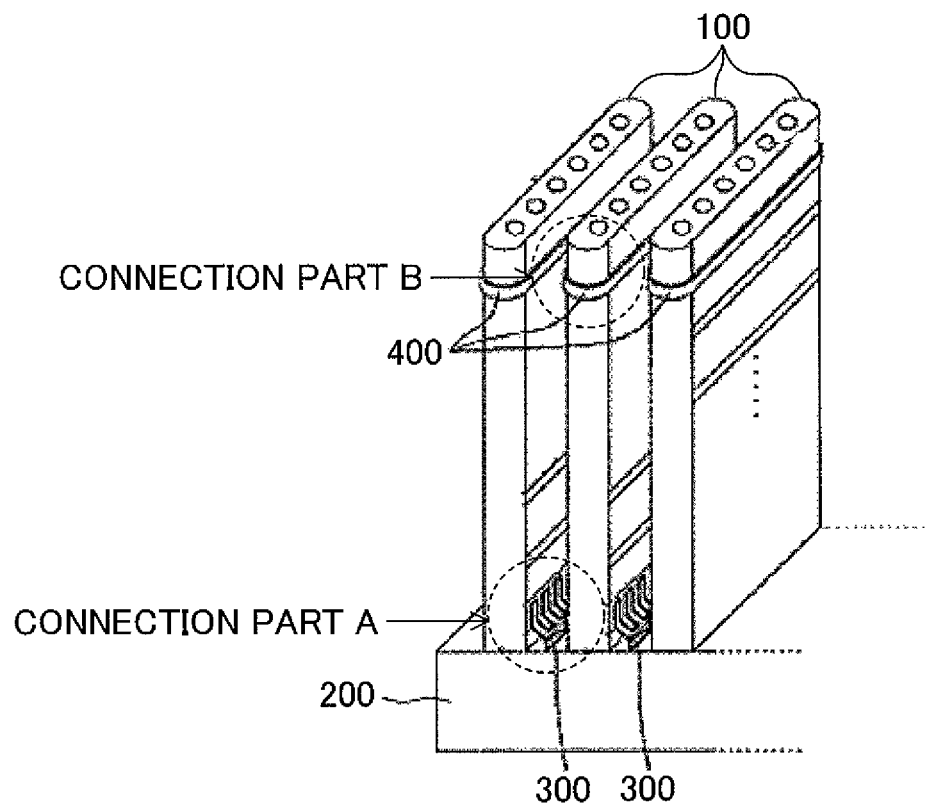
FIG. 1 is a perspective view illustrating a "connected body connecting electrically between power generation parts of SOFCs" according to an embodiment of the present invention.
Figure 2:
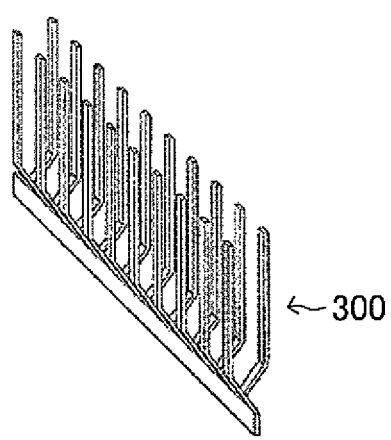
FIG. 2 is a perspective view illustrating an example of the entire shape of a connecting member for electrically connecting adjacent SOFCs illustrated in FIG. 1.

FIG. 1 illustrates an example of a "connected body connecting electrically between power generation parts of SOFCs" according to an embodiment of the present invention. In the example illustrated in FIG. 1, many plate-like SOFCs 100 are fixed and arranged so as to be aligned in parallel at predetermined intervals through the use of a fixing member 200. As an example of the "connected body" according to the embodiment of the present invention, there are given a "connected body connecting between adjacent segmented-in-series type SOFCs 100 with each other with a connecting member 300" at a connection part A (see FIG. 1) and a "connecting member for connecting both surfaces of one segmented-in-series type SOFC 100 to each other with a connecting member (metallic band) 400" at a connection part B (see FIG. 1). An example of the entire shape of the connecting member 300 is as illustrated in FIG. 2. Hereinafter, the details of each of the SOFCs 100 illustrated in FIG. 1 are described.

(Configuration of SOFC)

Figure 3:
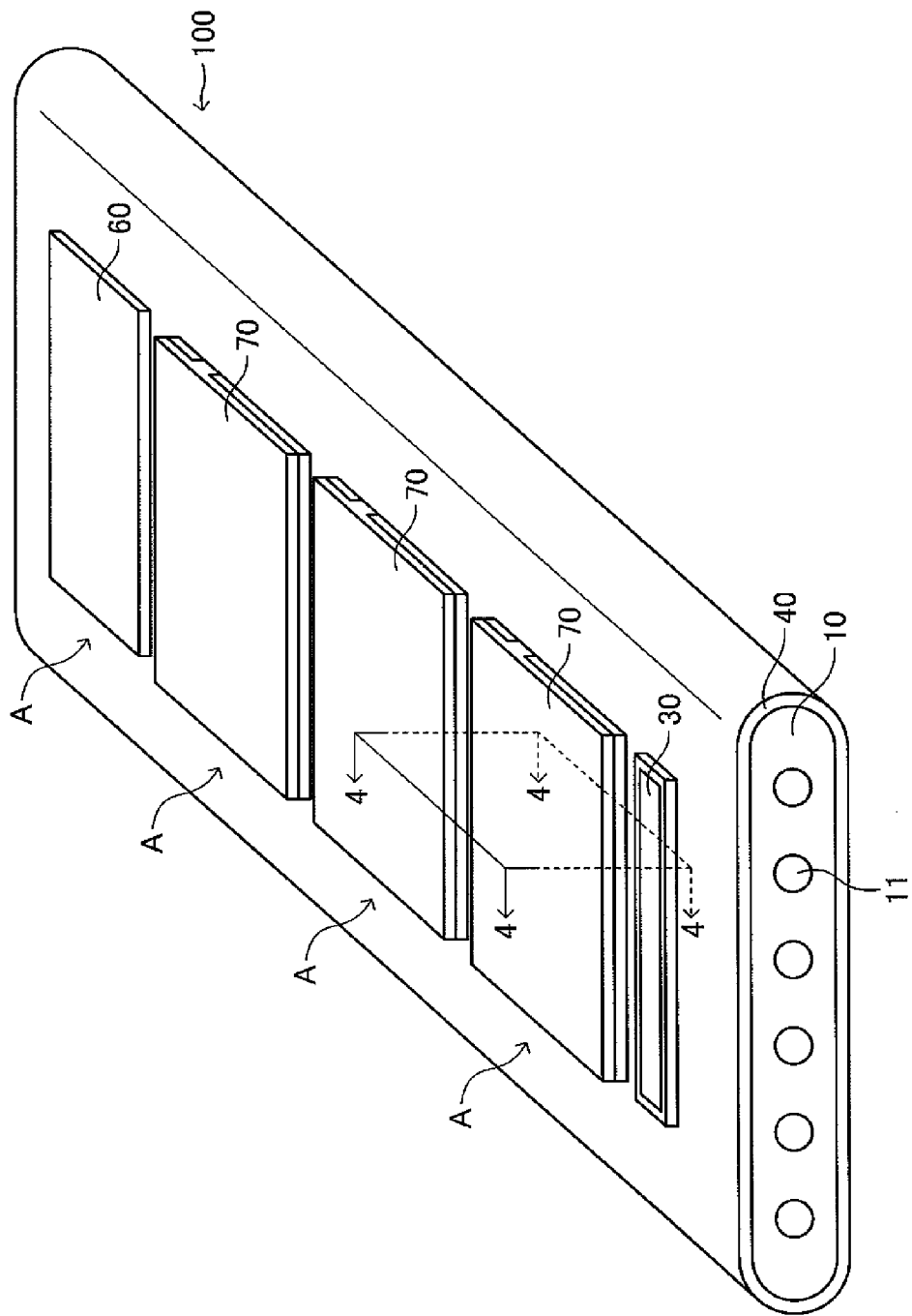
FIG. 3 is a perspective view illustrating an SOFC to be connected with the connected body according to the embodiment of the present invention.

FIG. 3 illustrates the entire SOFC 100 illustrated in FIG. 1. The SOFC has a configuration called a "segmented-in-series type" in which, on each of the upper and lower surfaces (opposite main surfaces (planes) parallel to each other) of a flat-plate-like support substrate 10 having a longitudinal direction, a plurality of (in this embodiment, four) power-generating elements A having the same shape and connected electrically in series are disposed at predetermined intervals along the longitudinal direction.

Figure 4:
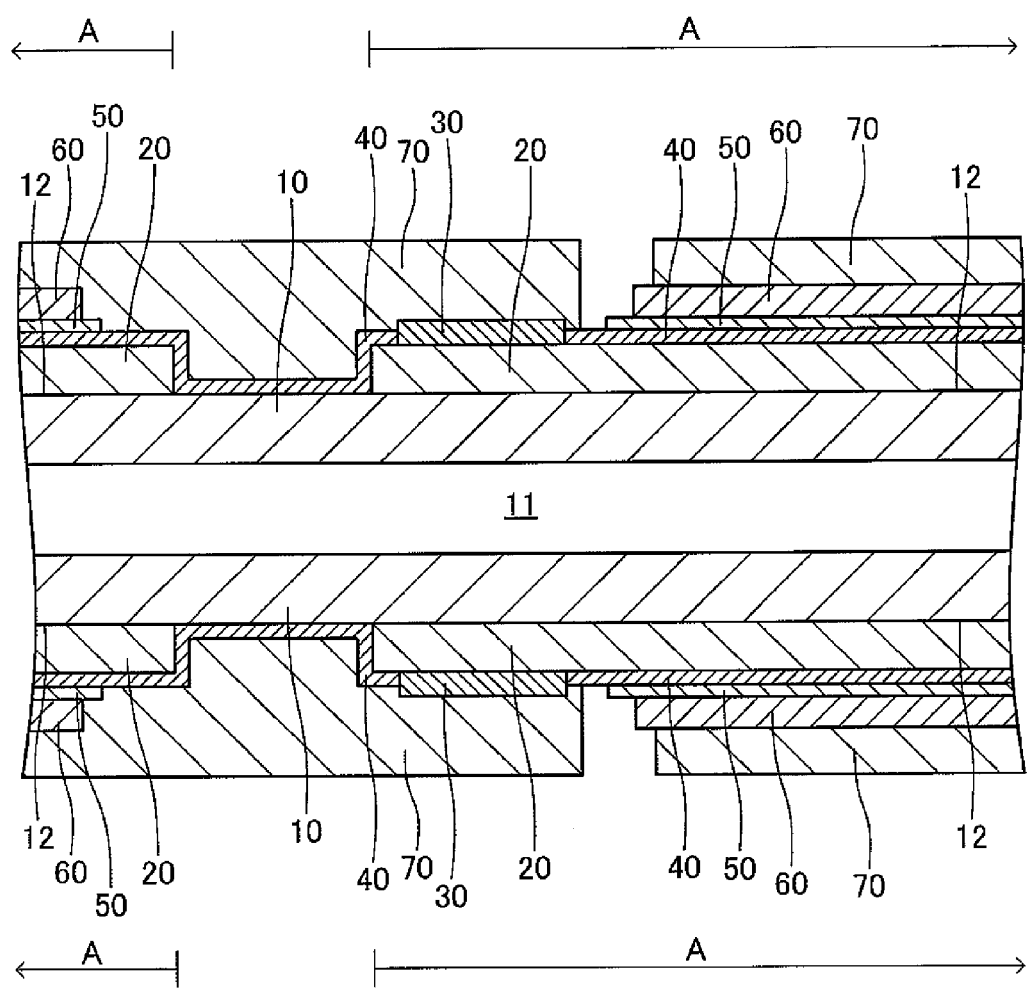
FIG. 4 is a sectional view corresponding to the line 4-4 of the fuel cell illustrated in FIG. 3.

As viewed from above, the entire SOFC has a rectangular shape with 5 to 50 cm on sides along the longitudinal direction and 1 to 10 cm on sides along a width direction orthogonal to the longitudinal direction. The total thickness of the SOFC is 1 to 5 mm. It is preferred that the entire SOFC have a vertically symmetrical shape with respect to a plane which passes the center with respect to the thickness direction and is parallel to the main surfaces of the support substrate 10, but the shape is not limited thereto. The SOFC is described in detail below with reference to, in addition to FIG. 3, FIG. 4, which is a fragmentary sectional view of the SOFC corresponding to the line 4-4 illustrated in FIG. 3. FIG. 4 is a fragmentary sectional view illustrating the configurations (parts of the configurations) of a typical pair of adjacent power-generating elements A, A and a configuration between the power-generating elements A, A. The configurations between adjacent power-generating elements A, A of other pairs are similar to that illustrated in FIG. 4.

The support substrate 10 is a flat-plate-like sintered body formed of a porous material having no electron conductivity. The end portions of outer surfaces of the support substrate 10 have curved surfaces convex outwardly (along the width direction). The support substrate 10 has a plurality of (in this embodiment, six) fuel gas flow channels 11 (through holes) formed therein, extending in the longitudinal direction, and disposed at predetermined intervals along the width direction.

The support substrate 10 may be formed of, for example, calcia-stabilized zirconia (CSZ). Alternatively, the support substrate 10 may be formed of nickel oxide (NiO) and yttria-stabilized zirconia (YSZ) (8YSZ), may be formed of nickel oxide (NiO) and yttria ($Y_2O_3$), or may be formed of magnesium oxide (MgO) and magnesia alumina spinel ($MgAl_2O_4$). The thickness of the support substrate 10 is 1 to 5 mm. For the purpose of simple description, only the configuration on the upper side of the support substrate 10 is described below. The configuration on the lower side of the support substrate 10 is the same as that on the upper side.

As illustrated in FIG. 4, a rectangular parallelepiped fuel electrode 20 is provided on the upper surface (upper main surface) of the support substrate 10. The fuel electrode 20 is a sintered body formed of a porous material having electron conductivity. Specifically, the fuel electrode 20 may include a fuel-electrode active portion, which is brought into contact with a solid electrolyte film 40 to be described later, and a fuel-electrode current-collecting portion, which corresponds to the residual portion of the fuel electrode except for the fuel-electrode active portion. As viewed from above, the fuel-electrode active portion has a rectangular shape extending along the width direction over the area where the fuel-electrode current-collecting portion is provided.

The fuel-electrode active portion may be formed of, for example, nickel oxide (NiO) and yttria-stabilized zirconia (YSZ) (8YSZ). Alternatively, the fuel-electrode active portion may be formed of nickel oxide (NiO) and gadolinium-doped ceria (GDC). The fuel-electrode current-collecting portion may be formed of, for example, nickel oxide (NiO) and yttria-stablized zirconia (YSZ) (8YSZ). Alternatively, the fuel-electrode current-collecting portion may be formed of nickel oxide (NiO) and yttria ($Y_2O_3$), or may be formed of nickel oxide (NiO) and calcia-stabilized zirconia (CSZ). The thickness of the fuel-electrode active portion is 5 to 30 μm and the thickness of the fuel-electrode current-collecting portion is 50 to 500 μm.

As described above, the fuel-electrode current-collecting portion includes a substance having electron conductivity. The fuel-electrode active portion includes a substance having electron conductivity and a substance having oxygen ion conductivity. The "volume ratio of a substance having oxygen ion conductivity relative to the total volume excluding pores" in the fuel-electrode active portion is larger than the "volume ratio of a substance having oxygen ion conductivity relative to the total volume excluding pores" in the fuel-electrode current-collecting portion.

An interconnector 30 is formed on a predetermined portion of the upper surface of each fuel electrode 20 (more specifically, each fuel-electrode current-collecting portion). The interconnector 30 is a sintered body formed of a dense conductive ceramics material having electron conductivity. As viewed from above, the interconnector 30 has a rectangular shape extending along the width direction over the area where the fuel electrode 20 is provided. The thickness of the interconnector 30 is 10 to 100 μm.

The interconnector 30 may be formed of, for example, lanthanum chromite (LC). The lanthanum chromite is represented by a chemical formula of $La_{1-x}A_xCr_{1-y-z}B_yO_3$ where A represents at least one kind of element selected from the group consisting of Ca, Sr, and Ba, B represents at least one kind of element selected from the group consisting of Co, Ni, Mg, and Al, and relationships of $0.05 \le x \le 0.2$, $0.02 \le y \le 0.22$, and $0 \le z \le 0.05$ are satisfied.

Alternatively, the interconnector 30 may be formed of a titanium oxide. The titanium oxide is represented by a chemical formula of $(A_{1-x}, B_x)_{1-z}(Ti_{1-y}, D_y)O_3$ where A represents at least one kind of element selected from the group consisting of alkaline earth elements, B represents at least one kind of element selected from the group consisting of Sc, Y, and lanthanoid elements, D represents at least one kind of element selected from the group consisting of fourth-period, fifth-period, and sixth-period transition metals and Al, Si, Zn, Ga, Ge, Sn, Sb, Pb, and Bi, and relationships of $0 \le x \le 0.5$, $0 \le y \le 0.5$, and $-0.05 \le z \le 0.05$ are satisfied. In this case, the interconnector 30 may be formed of strontium titanate (Sr, La)$TiO_3$).

The use of lanthanum chromite (LC) or strontium titanate ((Sr, La)$TiO_3$) as the material for the interconnector 30 as described above is based on the fact that one end (inner side) of the interconnector (terminal electrode) 30 is exposed to a reducing atmosphere and the other end (outer side) is exposed to an oxidizing atmosphere. At present, as a conductive ceramics stable both in the reducing atmosphere and the oxidizing atmosphere, LC and (Sr, La)$TiO_3$ are excellent.

The solid electrolyte film 40 covers the entire longitudinally extending outer surface of the support substrate 10 on which a plurality of the fuel electrodes 20 are provided, except for surface regions on which a plurality of the interconnectors 30 are formed. The solid electrolyte film 40 is a sintered body formed of a dense material having ion conductivity and having no electron conductivity. The solid electrolyte film 40 may be formed of yttria-stabilized zirconia (YSZ) containing yttria ($Y_2O_3$), for example. Alternatively, the solid electrolyte film 40 may be formed of lanthanum gallate (LSGM). The thickness of the solid electrolyte film 40 is 3 to 50 μm.

Namely, a dense layer formed of the interconnectors 30 and the solid electrolyte film 40 covers the entire longitudinally extending outer surface of the support substrate 10 on which a plurality of the fuel electrodes 20 are provided. The dense layer exhibits a gas seal function of preventing the mixing of a fuel gas flowing through a space on the inside of the dense layer and air flowing through a space on the outside of the dense layer. In this case, "the interconnectors 30 and the solid electrolyte film 40" formed of dense materials may be collectively referred to as "gas seal portion."

Air electrodes 60 are formed, via respective reaction prevention films 50, on the respective upper surfaces of those portions of the solid electrolyte film 40 which are in contact with the fuel-electrode active portions. The reaction prevention film 50 is a sintered body formed of a dense material, and the air electrode 60 is a sintered body formed of a porous material having electron conductivity and ion conductivity. As viewed from above, the reaction prevention film 50 and the air electrode 60 each have a rectangular shape substantially similar to that of the fuel-electrode active portion.

The reaction prevention film 50 may be formed of, for example, gadolinium-doped ceria (GDC=(Ce, Gd)$O_2$). The thickness of the reaction prevention film 50 is 3 to 50 μm. The air electrode 60 may be formed of, for example, lanthanum strontium cobalt ferrite (LSCF=(La, Sr)(Co, Fe)O$_3$). Alternatively, the air electrode 60 may be formed of lanthanum strontium ferrite (LSF=(La, Sr)FeO$_3$), lanthanum nickel ferrite (LNF=La(Ni, Fe)O$_3$), lanthanum strontium cobaltite (LSC=(La, Sr)CoO$_3$), or the like. Alternatively, the air electrode 60 may be formed of two layers including a first layer (inner layer) formed of LSCF and a second layer (outer layer) of LSC. The thickness of the air electrode 60 is 10 to 100 μm.

It should be noted that the reason for using the reaction prevention film 50 as an intervening film is to suppress the occurrence of the phenomenon that, during SOFC production or in an operating SOFC, YSZ in the solid electrolyte film 40 and Sr in the air electrode 60 react with each other to form a reaction film having high electric resistance at the interface between the solid electrolyte film 40 and the air electrode 60.

In this case, a laminate of the fuel electrode 20, the solid electrolyte film 40, the reaction prevention film 50, and the air electrode 60 corresponds to a "power-generating element A" (see FIG. 4). That is, on the upper surface of the support substrate 10, a plurality of (in this embodiment, four) the power-generating elements A are disposed at predetermined intervals along the longitudinal direction.

In each pair of the adjacent power-generating elements A, A, an air-electrode current-collecting film 70 is formed on the upper surfaces of the air electrode 60, the solid electrolyte film 40, and the interconnector 30 in such a manner as to bridge the air electrode 60 of one (in FIG. 4, the left) power-generating element A and the interconnector 30 of the other (in FIG. 4, the right) power-generating element A. The air-electrode current-collecting film 70 is a sintered body formed of a porous material having electron conductivity. As viewed from above, the air-electrode current-collecting film 70 has a rectangular shape.

The air-electrode current-collecting film 70 may be formed of, for example, lanthanum strontium cobalt ferrite (LSCF=(La, Sr)(Co, Fe)O$_3$). Alternatively, the air-electrode current-collecting film 70 may be formed of lanthanum strontium cobaltite (LSC=(La, Sr)CoO$_3$). Alternatively, the air-electrode current-collecting film 70 may be formed of silver (Ag) or a silver-palladium alloy (Ag—Pd). The thickness of the air-electrode current-collecting film 70 is 50 to 500 μm.

As described above, through formation of the air-electrode current-collecting films 70, in each pair of the adjacent power-generating elements A, A, the air electrode 60 of one (in FIG. 4, the left) power-generating element A and the fuel electrode 20 (particularly, the fuel-electrode current-collecting portion) of the other (in FIG. 4, the right) power-generating element A are electrically connected to each other via "the air-electrode current-collecting film 70 and the interconnector 30" having electron conductivity. As a result, a plurality of (in this embodiment, four) power-generating elements A disposed on the upper surface of the support substrate 10 are connected electrically in series. In this case, "the air-electrode current-collecting film 70 and the interconnector 30" having electron conductivity may be collectively referred to as "electrical connection."

In the "segmented-in-series type" SOFC as described above, as illustrated in FIG. 5, a fuel gas (hydrogen gas or the like) is allowed to flow through the fuel gas flow channels 11 of the support substrate 10, and the upper and lower surfaces of the support substrate 10 (particularly the air-electrode current-collecting films 70) are exposed to a "gas containing oxygen" (air or the like) (alternatively, a gas containing oxygen is allowed to flow along the upper and lower surfaces of the support substrate 10), whereby an electromotive force is generated according to a difference in partial pressure of oxygen between the opposite surfaces of the solid electrolyte film 40. Further, when this structure is connected to an external load, chemical reactions represented by the following formulae (1) and (2) occur, and a current flows (power generation condition).

$$(\tfrac{1}{2}) \cdot O_2 + 2e^- \rightarrow O^{2-} \text{ (at the air electrode 60)} \quad (1)$$

$$H_2 + O^{2-} \rightarrow H_2O + 2e^- \text{ (at the fuel electrode 20)} \quad (2)$$

Figure 5:
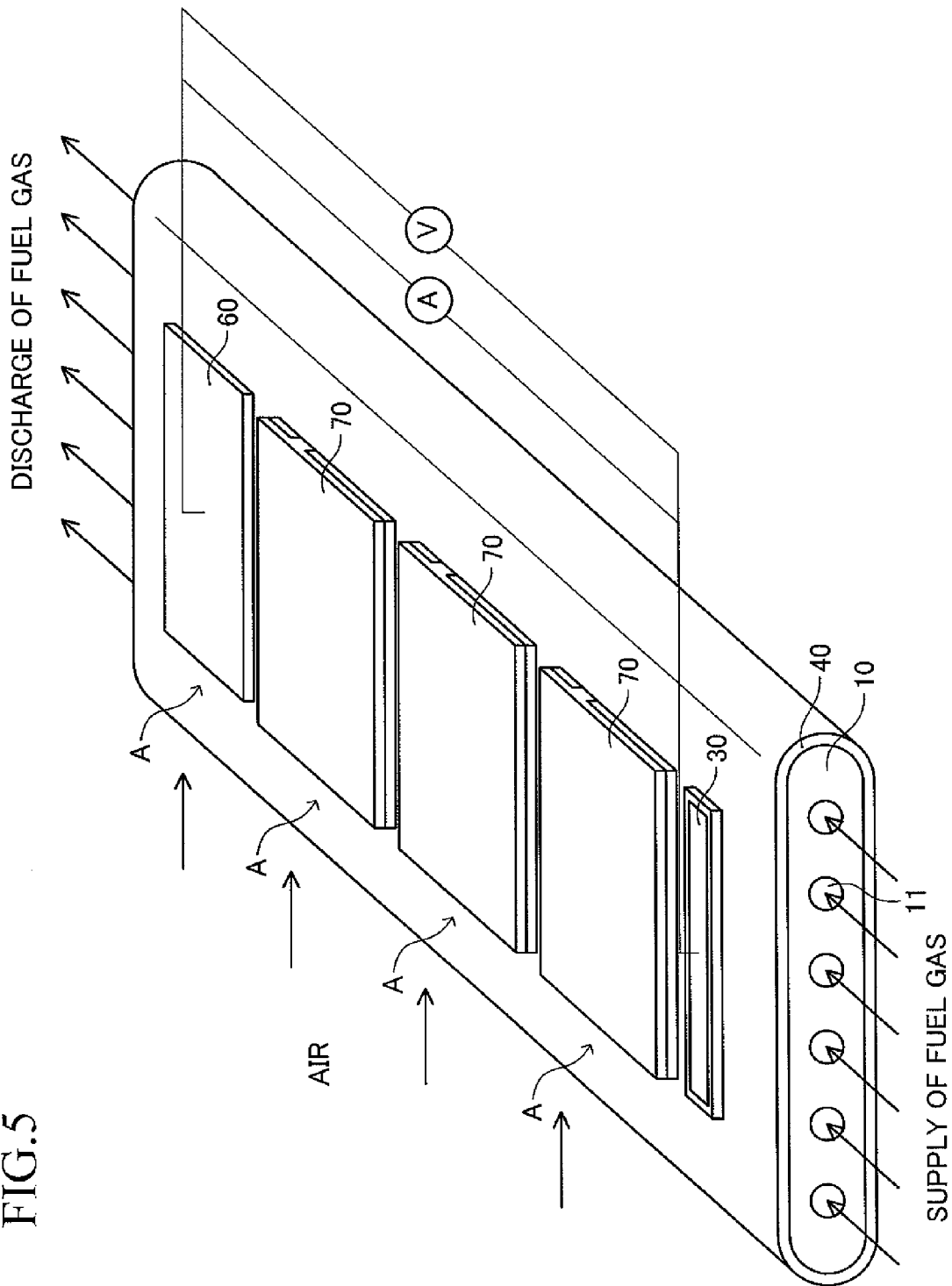
FIG. 5 is a view illustrating an operation state of the fuel cell illustrated in FIG. 3.
Figure 6:
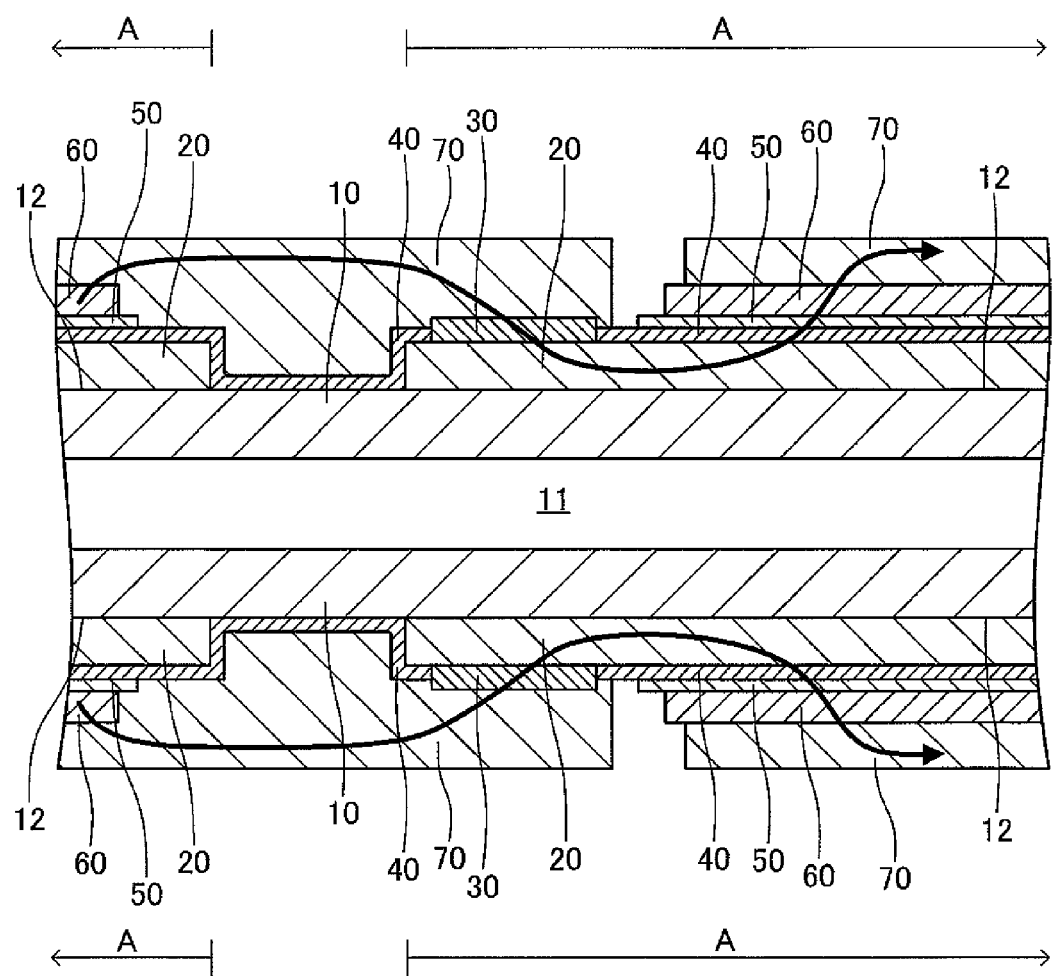
FIG. 6 is a view illustrating the flow of a current under the operation state of the fuel cell illustrated in FIG. 3.

In the power generation condition, as illustrated in FIG. 6, in each pair of the adjacent power-generating elements A, A, a current flows as indicated by the arrows. As a result, power is output from the entire SOFC as illustrated in FIG. 5 (specifically, via the interconnector 30 of the power-generating element A located on the nearest side in FIG. 5 and the air electrode 60 of the power-generating element A located on the farthest side in FIG. 5).

(Manufacturing Method for SOFC)

Next, an exemplary manufacturing method for the "segmented-in-series type" SOFC 100 illustrated in FIG. 3 is briefly described with reference to FIGS. 7 to 14. In FIGS. 7 to 14, the trailing letter "g" of reference numerals of members indicates that the members are "green."

Figure 7:
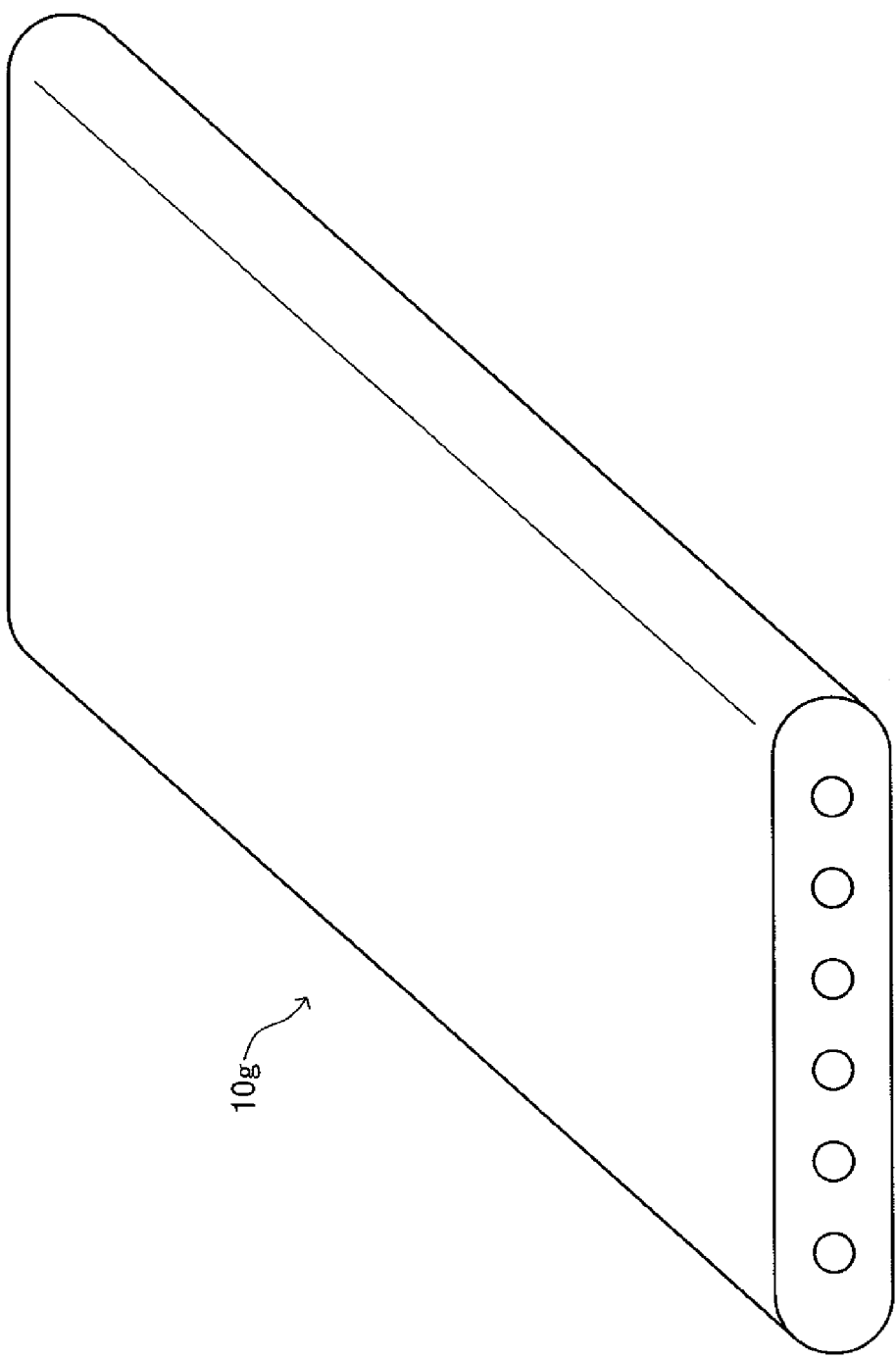
FIG. 7 is a perspective view illustrating a support substrate illustrated in FIG. 3.

First, a green body 10g of the support substrate having a shape illustrated in FIG. 7 is produced. The green body 10g of the support substrate can be produced, for example, by use of a slurry prepared by adding a binder and the like to a powder of a material (e.g., CSZ) for the support substrate 10 and through utilization of extrusion molding, machining, and other working processes. The description of the method continues below with reference to FIGS. 8 to 14, which are fragmentary sectional views of the green body 10g of the support substrate illustrated in FIG. 7.

Figure 8:
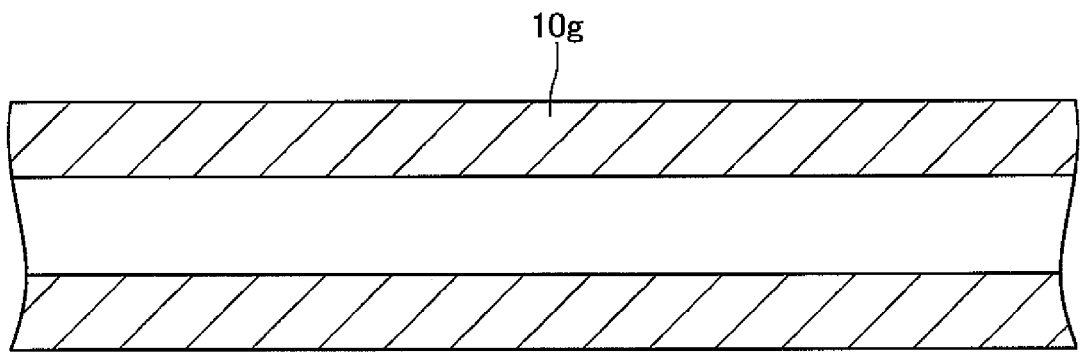
FIG. 8 is a sectional view corresponding to FIG. 4 as viewed at the first stage in a process for manufacturing the fuel cell illustrated in FIG. 3.
Figure 9:
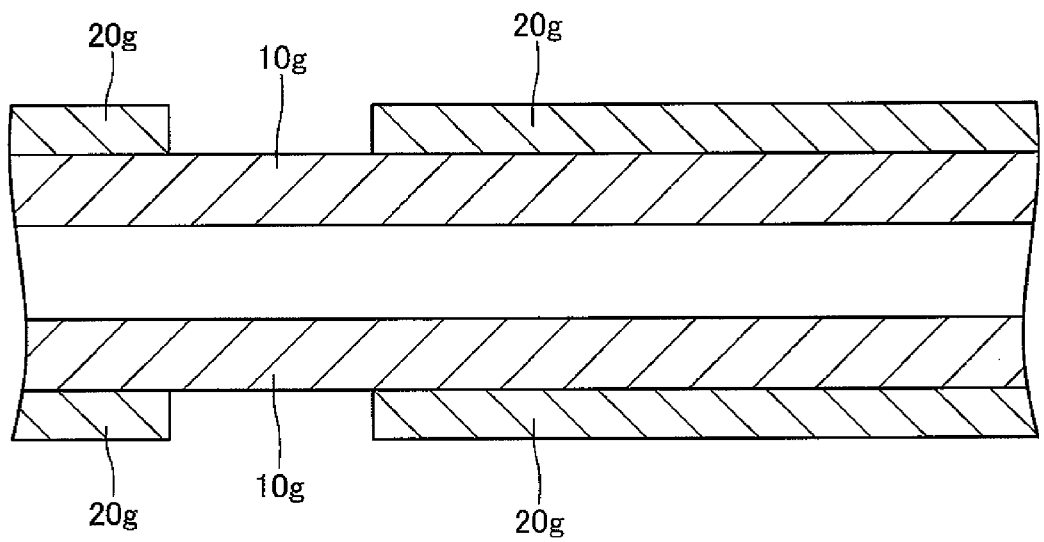
FIG. 9 is a sectional view corresponding to FIG. 4 as viewed at the second stage in the process for manufacturing of the fuel cell illustrated in FIG. 3.

After the green body 10g of the support substrate is produced as illustrated in FIG. 8, as illustrated in FIG. 9, green bodies 20g of the fuel electrodes are formed at predetermined positions on the upper and lower surfaces of the green body 10g of the support substrate. The green bodies 20g of the fuel electrodes are formed, for example, by use of a slurry prepared by adding a binder and the like to a powder of a material (e.g., Ni and YSZ) for the fuel electrode 20 and through utilization of a printing process, or the like.

Figure 10:
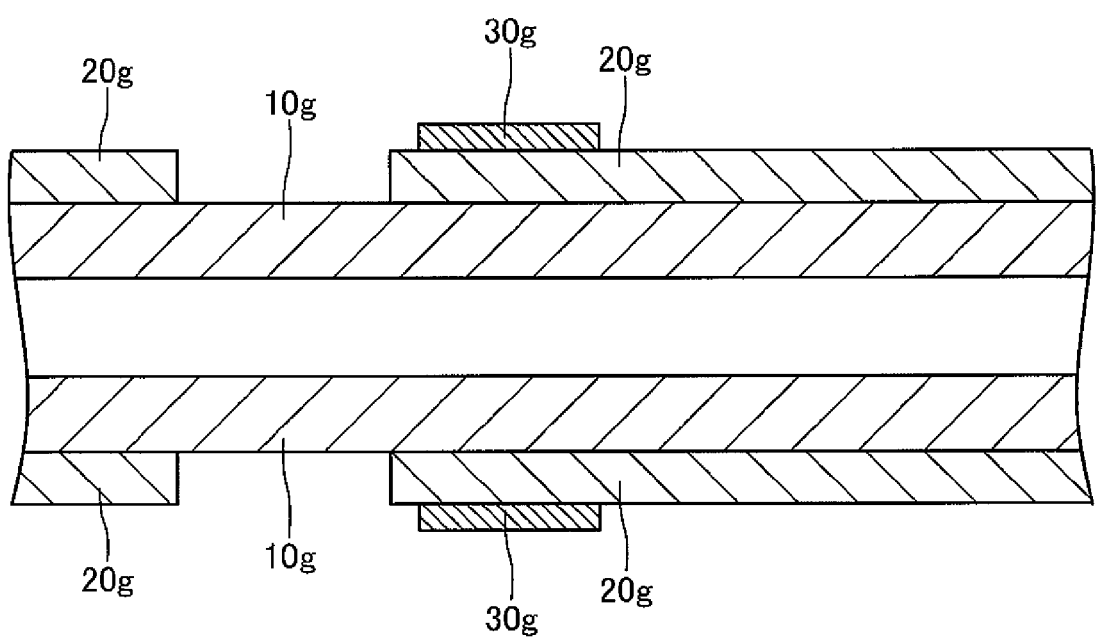
FIG. 10 is a sectional view corresponding to FIG. 4 as viewed at the third stage in the process for manufacturing the fuel cell illustrated in FIG. 3.

Next, as illustrated in FIG. 10, green films 30g of the interconnectors are formed at predetermined positions on the outer surfaces of the green bodies 20g of the fuel electrodes. The green films 30g of the interconnectors are formed, for example, by use of a slurry prepared by adding a binder and the like to a powder of a material (e.g., LaCrO$_3$) for the interconnector 30 and through utilization of a printing process or the like.

Figure 11:
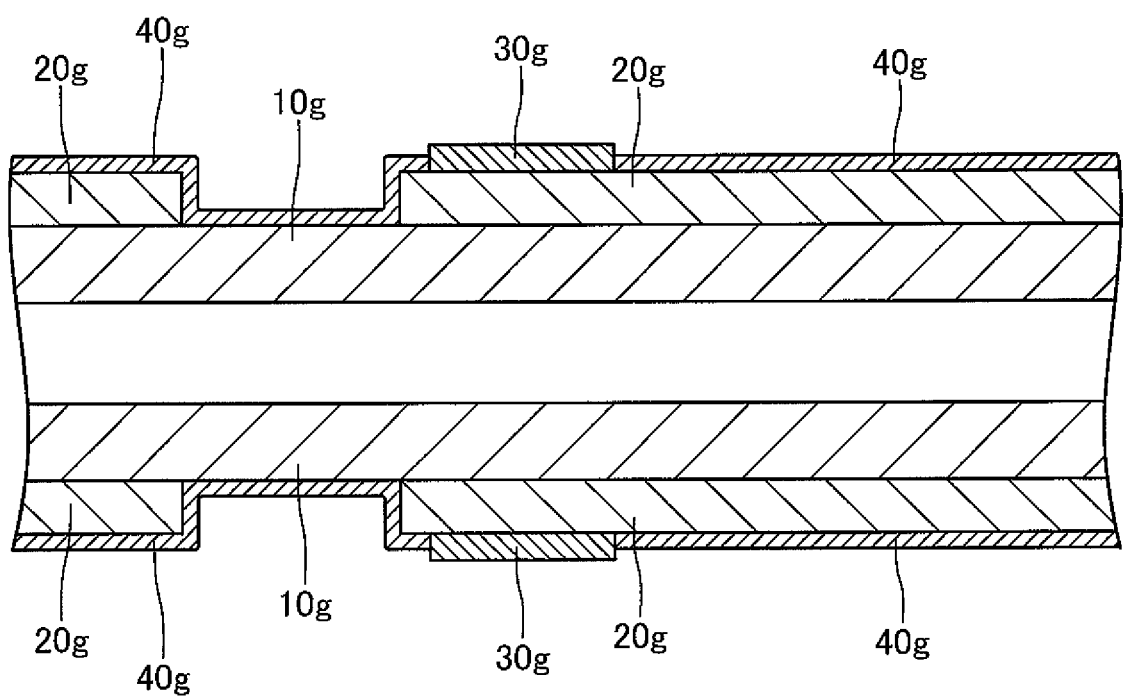
FIG. 11 is a sectional view corresponding to FIG. 4 as viewed at the fourth stage in the process for manufacturing the fuel cell illustrated in FIG. 3.

Next, as illustrated in FIG. 11, a green film 40g of the solid electrolyte film is formed on the entire longitudinally extending outer surface of the green body 10g of the support substrate in which a plurality of the green bodies 20g of the fuel electrodes and are formed (including outer end surfaces of the green body 10g of the support substrate), except for portions on which a plurality of the green bodies 30g of the interconnectors are formed. The green film 40g of the solid electrolyte film is formed, for example, by use of a slurry prepared by adding a binder and the like to a powder of a material (e.g., YSZ) for the solid electrolyte film 40 and through utilization of a printing process, a dipping process, or the like.

Figure 12:
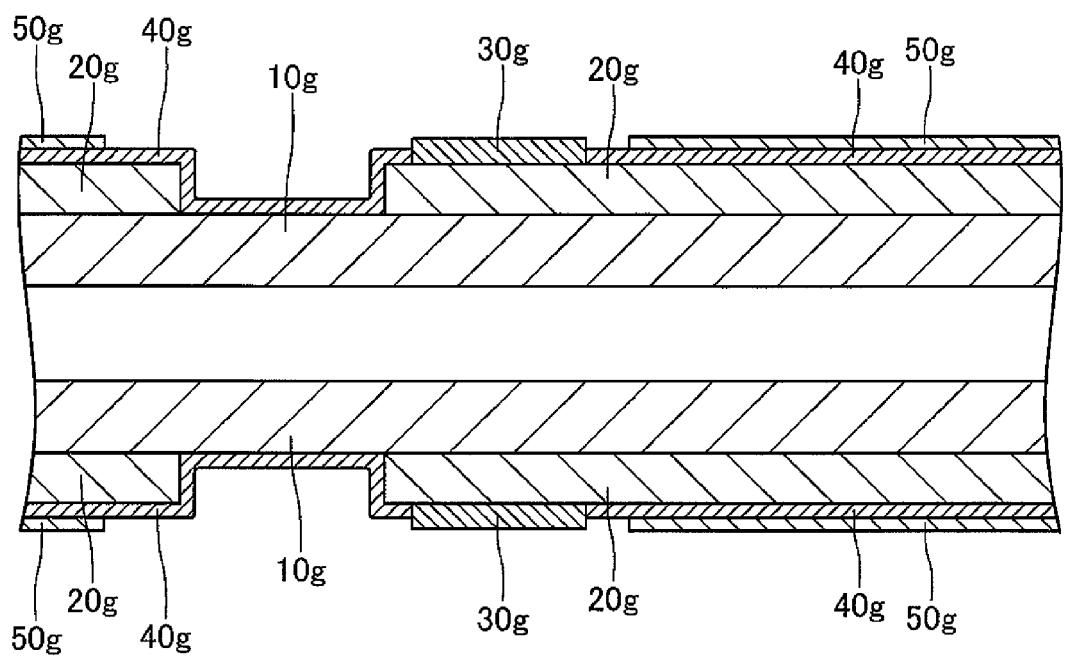
FIG. 12 is a sectional view corresponding to FIG. 4 as viewed at the fifth stage in the process for manufacturing the fuel cell illustrated in FIG. 3.

Next, as illustrated in FIG. 12, green films 50g of the reaction prevention films are formed on the respective outer surfaces of those portions of the green body 40g of the solid electrolyte film which are in contact with the green bodies 20g of the fuel electrodes. The green films 50g of the reaction prevention films are formed, for example, by use of a slurry prepared by adding a binder and the like to a powder of a material (e.g., GDC) for the reaction prevention film 50 and through utilization of a printing process or the like.

Then, the green body 10g of the support substrate on which such various green films are formed is sintered at 1,400 to 1,500° C. for 1 to 20 hours in air. By this procedure, there is yielded a structure in a state in which the air electrodes 60 and the air-electrode current-collecting films 70 are removed from the SOFC illustrated in FIG. 3.

Figure 13:
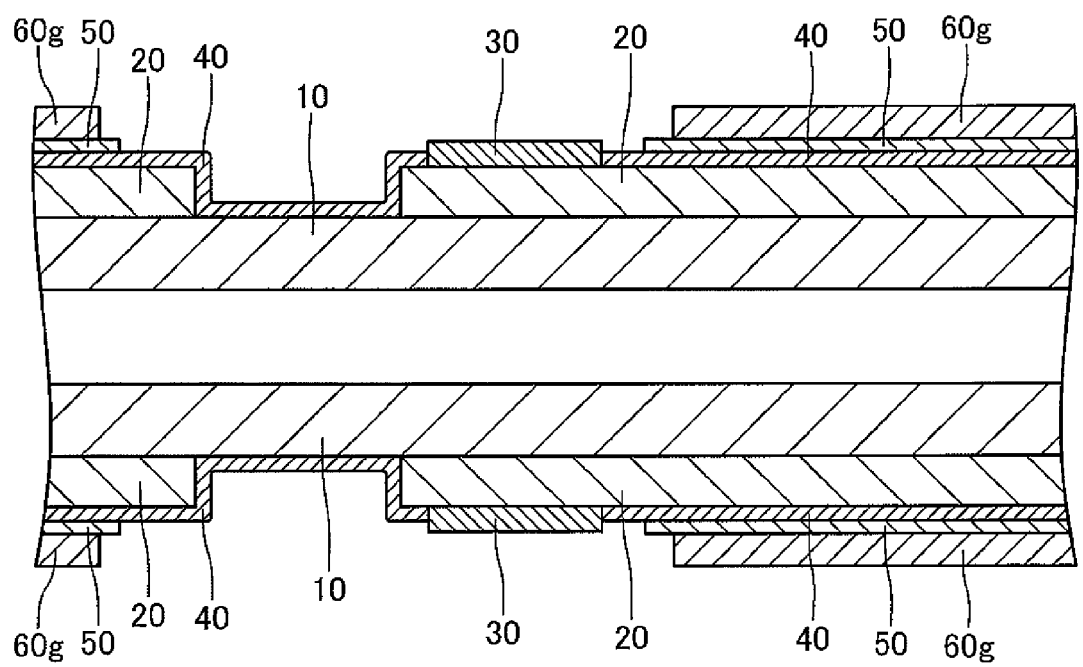
FIG. 13 is a sectional view corresponding to FIG. 4 as viewed at the sixth stage in the process for manufacturing structure of the fuel cell illustrated in FIG. 3.

Next, as illustrated in FIG. 13, green films 60g of the air electrodes are formed on the outer surfaces of the reaction prevention films 50, respectively. The green films 60g of the air electrodes are formed, for example, by use of a slurry prepared by adding a binder and the like to a powder of a material (e.g., LSCF) for the air electrode 60 and through utilization of a printing process or the like.

Figure 14:
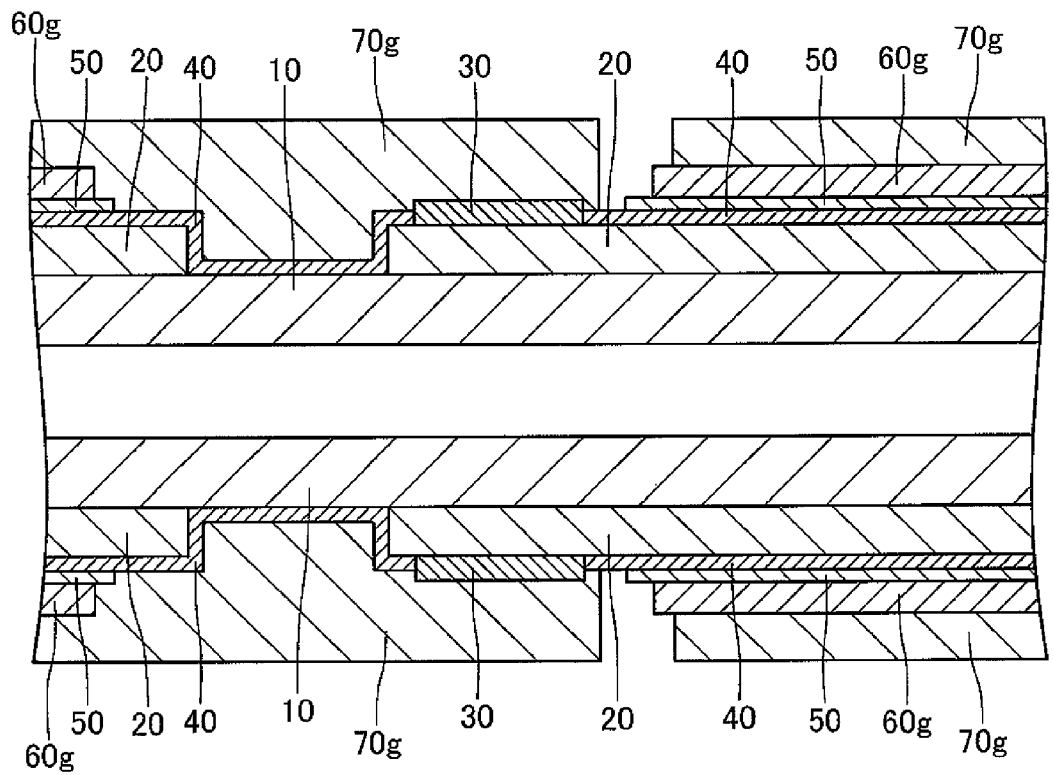
FIG. 14 is a sectional view corresponding to FIG. 4 as viewed at the seventh stage in the process for manufacturing the fuel cell illustrated in FIG. 3.

Next, as illustrated in FIG. 14, in each pair of the adjacent power-generating elements, a green film 70g of the air-electrode current-collecting film is formed on the outer surfaces of the green film 60g of the air electrode, the solid electrolyte film 40, and the interconnector 30 in such a manner as to bridge the green film 60g of the air electrode of one power-generating element and the interconnector 30 of the other power-generating element. The green films 70g of the air-electrode current-collecting films are formed, for example, by use of a slurry prepared by adding a binder and the like to a powder of a material (e.g., LSCF) for the air-electrode current-collecting film 70 and through utilization of a printing process or the like.

Then, the support substrate 10 in a state in which the green films 60g and 70g are thus formed is sintered at 900 to 1,100° C. for 1 to 20 hours in air. The air electrodes 60 are sintered at a lower temperature than the fuel electrodes 20. By this procedure, the SOFC illustrated in FIG. 3 is yielded. So far, the example exemplary manufacturing method for the SOFC 100 illustrated in FIG. 3 has been described.

(Configuration of Connected Body and Actions and Effects Thereof)

Figure 15:
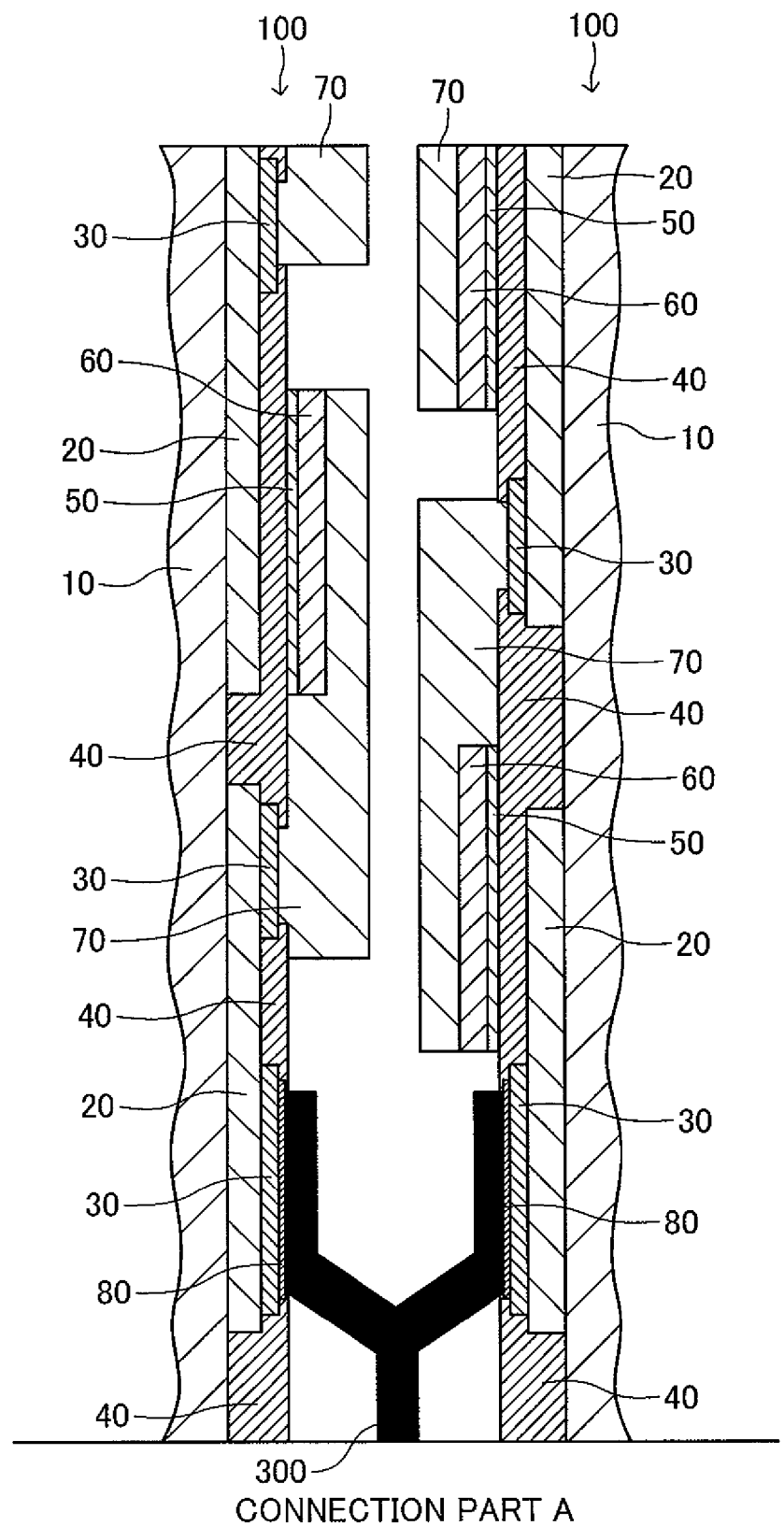
FIG. 15 is a view corresponding to FIG. 4 for illustrating a state in which adjacent segmented-in-series type SOFCs are connected to each other with the connecting member in the connected body illustrated in FIG. 1.
Figure 16:
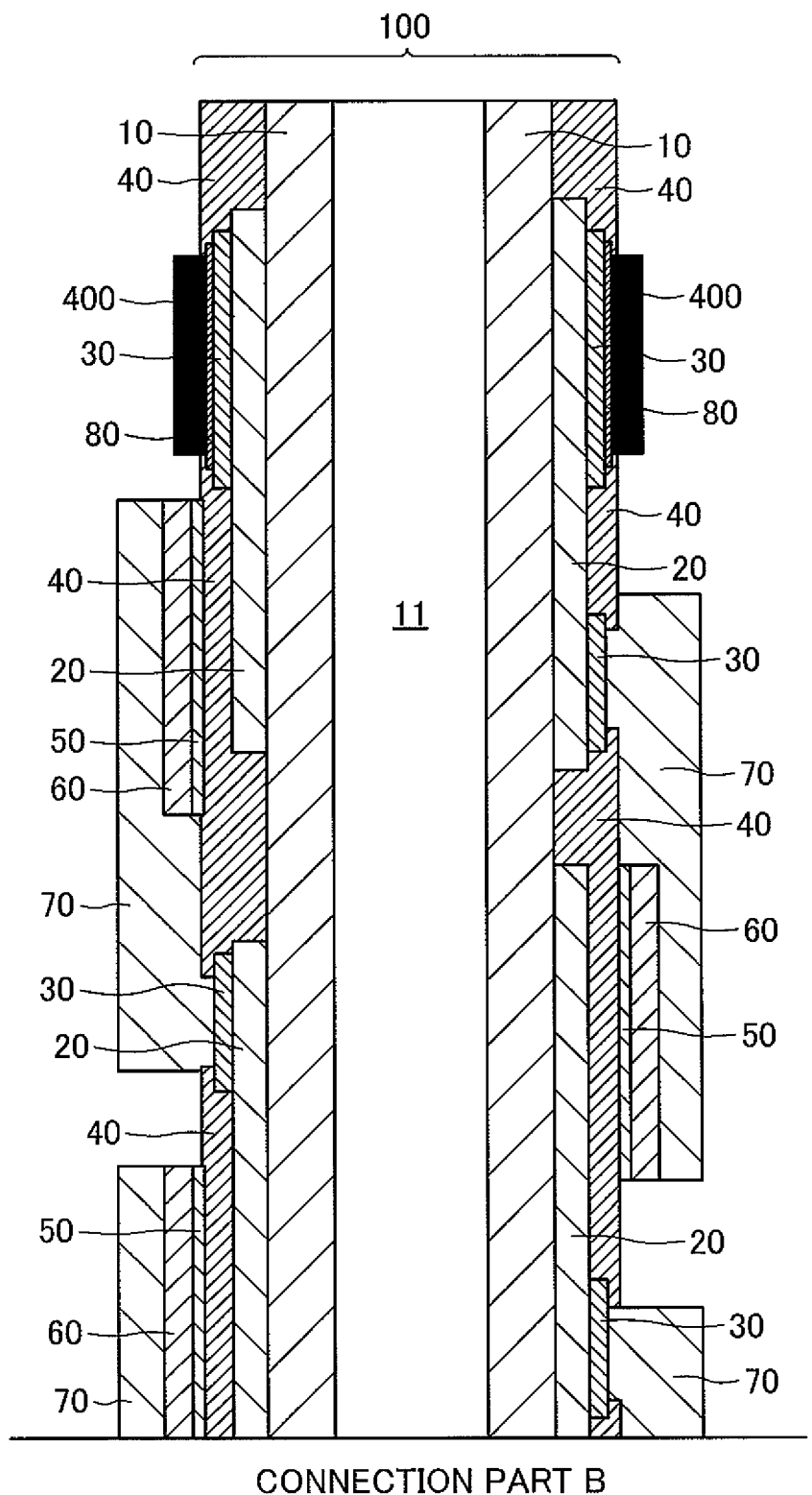
FIG. 16 is a view corresponding to FIG. 4 for illustrating a state in which both surfaces of one segmented-in-series type SOFC are connected to each other with the connecting member in the connected body illustrated in FIG. 1.

Next, the detailed configuration of the "connected body" according to the embodiment of the present invention illustrated in FIG. 1 is described. As illustrated in FIG. 1, in the plurality of SOFCs 100 aligned and arranged with the fixing member, a connected body illustrated in FIG. 15 is formed at the connection part A (see FIG. 1) and a connected body illustrated in FIG. 16 is formed at the connection part B (see FIG. 1). The members of FIGS. 15 and 16 identical or equivalent to those illustrated in FIG. 3 are represented by the same reference symbols as those shown in FIG. 3.

As illustrated in FIG. 15, the adjacent two segmented-in-series type SOFCs 100, 100 are connected to each other with the connecting member 300 (see FIG. 2 for the entire shape) at the connection part A. In FIG. 15, specifically, a "left side end portion of the connecting member 300" and the "interconnector 30 electrically connected to the air electrode 60 provided on the SOFC 100 on the left side (via the air-electrode current-collecting film 70, the interconnector 30, and the fuel electrode 20 (more accurately, the conductive ceramics formed of the same material as the fuel electrode 20))" are electrically connected to each other with a connecting material 80.

In FIG. 15, similarly, a "right side end portion of the connecting member 300" and the "interconnector 30 electrically connected to the fuel electrode 20 provided on the SOFC 100 on the right side" are electrically connected to each other with the connecting material 80. According to this configuration, the adjacent two segmented-in-series type SOFCs 100, 100 are electrically connected in series. As a result, a high output voltage can be obtained.

In this case, the connecting member 300 is formed of, for example, a dense metal material typified by a stainless-steel-based material (SUS material) mainly containing Fe and Cr such as ZMG232L manufactured by Hitachi Metals, Ltd. It should be noted that a coating film (thickness: 3 to 30 μm) formed of $MnCo_2O_4$ may be formed as an oxidation-resistant coating film on the surface of the connecting member 300. Further, both of the interconnectors 30, 30 to be connected to both end portions of the connecting member 300 with the connecting material 80 are formed of the dense conductive ceramics such as lanthanum chromite (LC) or strontium titanate (Sr, La)$TiO_3$ as described above. The material for the interconnectors 30, 30 has a porosity of 15% or less, preferably 10% or less, more preferably 7% or less. The connecting material 80 is formed of a conductive ceramics material such as $MnCo_2O_4$. The connecting material 80 is formed through sintering and the sintering temperature of the connecting material 80 is 800 to 1,000° C., for example.

As described above, both of the interconnectors 30, 30 to be respectively connected to both end portions of the metallic connecting member 300 with the connecting material 80 are formed of dense conductive ceramics materials at the connection part A illustrated in FIG. 1. Thus, at the connection part A, there can be provided a connected body having high connection strength and having high reliability of electric connection between the connecting member 300 and each of the interconnectors 30, 30.

In addition, both of the interconnectors 30, 30 to be respectively connected to both end portions of the connecting member 300 are connected to the fuel electrodes 20 (alternatively, conductive ceramics formed of the same material as the fuel electrode 20). Therefore, the connection strength of the interconnectors 30, 30 with respect to the support substrate 10 can be increased as compared to the case where one of the interconnectors 30, 30 is directly connected to the air electrode 60. This is based on the fact that the air electrode 60 (ceramics sintered body) is more fragile than the fuel electrode 20 (alternatively, conductive ceramics formed of the same material as the fuel electrode 20, ceramics sintered body) because the air electrode 60 is sintered at a lower temperature than the fuel electrode 20 (alternatively, conductive ceramics formed of the same material as the fuel electrode 20).

The interconnectors 30, 30 may be directly connected to each other with the connecting material 80 not via the connecting member 300. Also in this case, there can be provided a connected body having high connection strength and high reliability of electric connection between the interconnectors 30, 30.

On the other hand, as illustrated in FIG. 16, at the connection part B, both surfaces of one segmented-in-series type SOFC 100 are connected to each other with the connecting member 400 (metallic band wound around the periphery of the cell 100). In FIG. 16, specifically, "part of the connecting member 400" and the "interconnector 30 electrically connected to the fuel electrode 20 provided on the left side of one SOFC 100" are electrically connected to each other with the connecting material 80.

In FIG. 16, similarly, "another part of the connecting member 400" and "the interconnector 30 electrically connected to the air electrode 60 provided on the right side of one SOFC 100 (via the air-electrode current-collecting film 70, the interconnector 30, and the fuel electrode 20 (more accurately, conductive ceramics formed of the same material as the fuel electrode 20))" are electrically connected to each other with the connecting material 80. According to this configuration, both surfaces of one segmented-in-series type SOFC 100 are electrically connected in series. As a result, a high output voltage can be obtained.

In this case, the connecting member (metallic band) 400 is formed of, for example, a dense metal material typified by a stainless-steel-based material (SUS material) mainly containing Fe and Cr such as ZMG232L manufactured by Hitachi Metals Ltd. in the same manner as the connecting member 300. It should be noted that a coating film (thickness: 3 to 30 µm) formed of $MnCo_2O_4$ may be formed as an oxidation-resistant coating film on the surface of the connecting member 400. Further, both of the interconnectors 30, 30 to be connected to the connecting member 400 with the connecting material 80 are formed of the dense conductive ceramics such as lanthanum chromite (LC) or strontium titanate (Sr, La)$TiO_3$ as described above. Also in this case, the material for the interconnectors 30, has a porosity of 15% or less, preferably 10% or less, more preferably 7% or less. The connecting material 80 is a sintered body formed of a conductive ceramics material such as $MnCo_2O_4$. The connecting material 80 is formed through sintering and the sintering temperature is 800 to 1,000° C., for example.

As described above, also at the connection part B illustrated in FIG. 1, both of the interconnectors 30, 30 to be connected to the metallic connecting member 400 with the connecting material 80 are formed of dense conductive ceramics materials. Therefore, also at the connection part B, there can be provided a connected body having high connection strength between the connecting member 400 and each of the interconnectors 30, 30 and having high reliability of electric connection in the same manner as the connection part A described above.

In addition, both of the interconnectors 30, 30 are connected to the fuel electrodes 20 (alternatively, conductive ceramics formed of the same material as the fuel electrodes 20). Therefore, the connection strength of the interconnectors 30, 30 with respect to the support substrate 10 can be increased as compared to the case where one of the interconnectors 30, 30 is directly connected to the air electrode 60 for the same reason as the case illustrated in FIG. 15.

It should be noted that the interconnectors 30, 30 may be directly connected to each other with the connecting material 80 not via the connecting member 400. Also in this case, there can be provided a connected body having high connection strength between the interconnectors 30, 30 and having high reliability of electric connection.

It should be noted that, in this embodiment, the porosity of a film was measured as described below. First, the so-called "resin-filling" treatment was conducted for the film so that the resin was filled into pores of the film. Then, mechanical polishing was conducted for the surface of the film subjected to the "resin-filling" treatment. Then, areas of pores (portions filled with the resin) and portions excluding the pores (portions not filled with the resin) were calculated, respectively, by conducting image processing for an image obtained through the scanning electron microscopic observation of microstructures of the surface subjected to the mechanical polishing. The ratio was defined as the porosity of the film.

It should be noted that the present invention is not limited to the embodiment described above, and various modified embodiments may be adopted without departing from the scope of the present invention. For example, in the embodiment described above, the "segmented-in-series type" SOFC (one cell is provided with a plurality of power generation parts) is adopted as the SOFC to be connected with the "connected body," but a "vertical stripe type" SOFC may be adopted as the SOFC to be connected with the "connected body". The "vertical stripe type" SOFC has a stack structure in which a plurality of SOFCs (one cell is provided with one power generation part) are laminated in the thickness direction of the cell.

Figure 17:
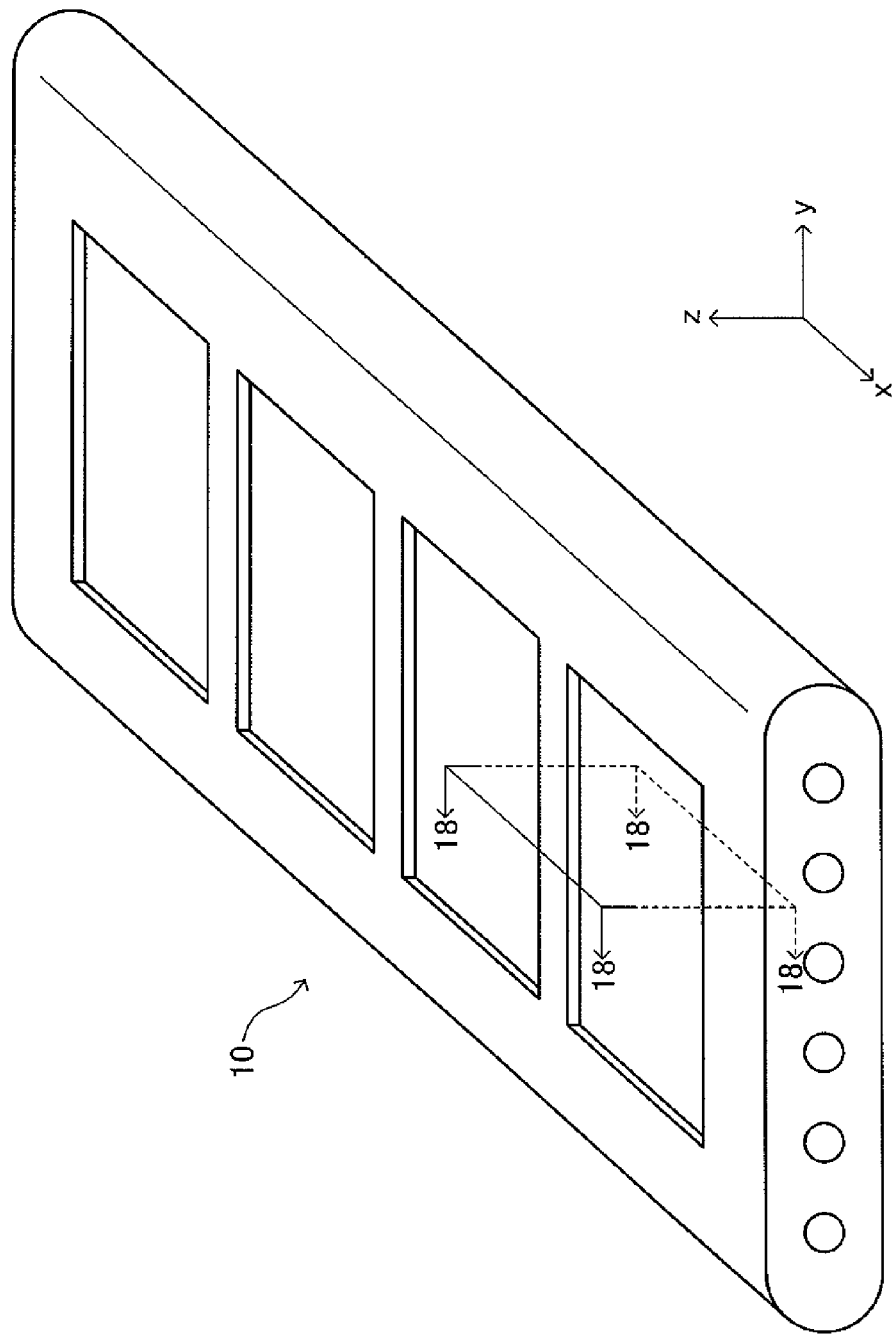
FIG. 17 is a perspective view corresponding to FIG. 7 of the fuel cell according to another modified embodiment of the embodiment of the present invention.
Figure 18:
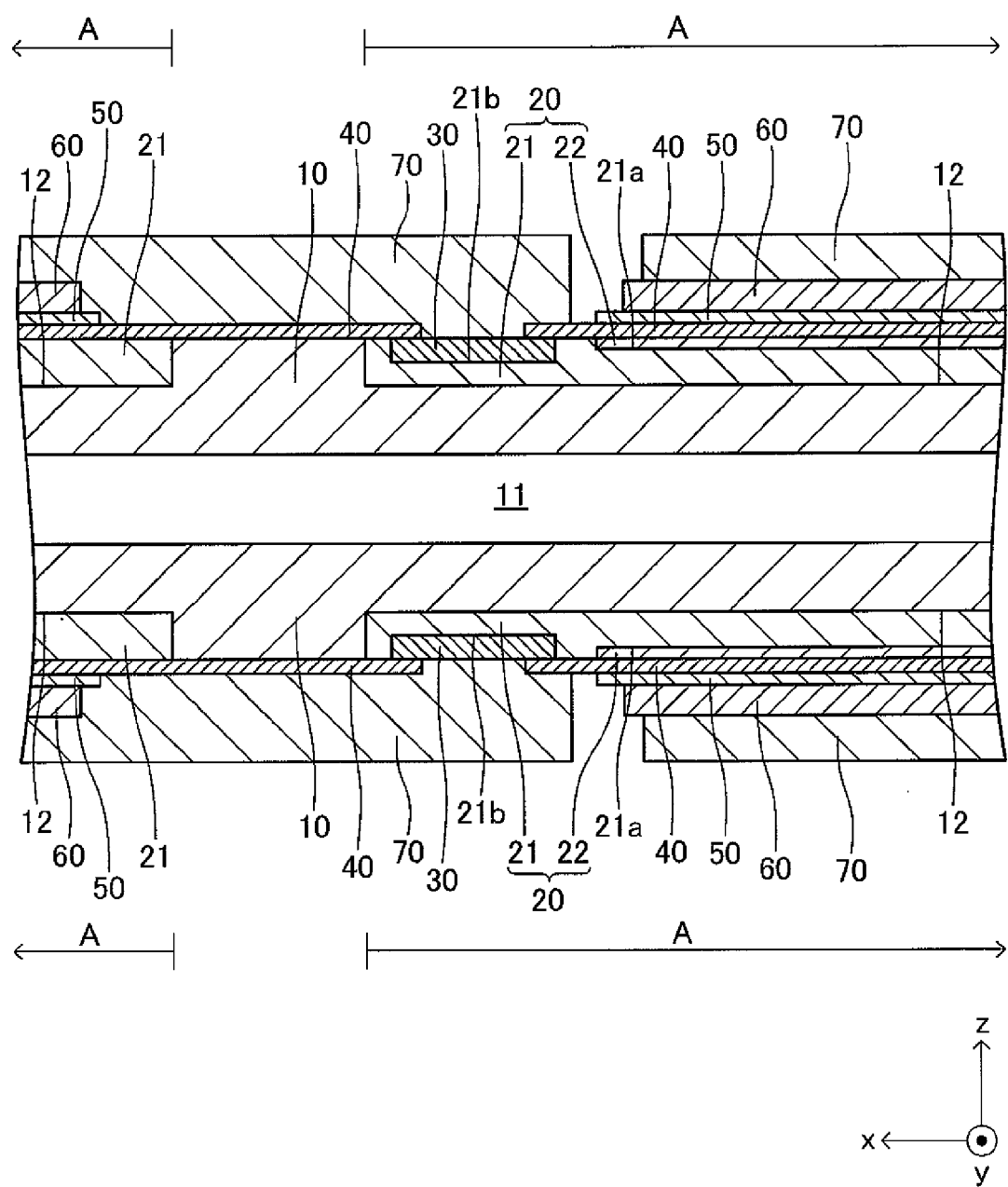
FIG. 18 is a sectional view corresponding to FIG. 2 of a fuel cell that adopts a support substrate illustrated in FIG. 17.
Figure 19:
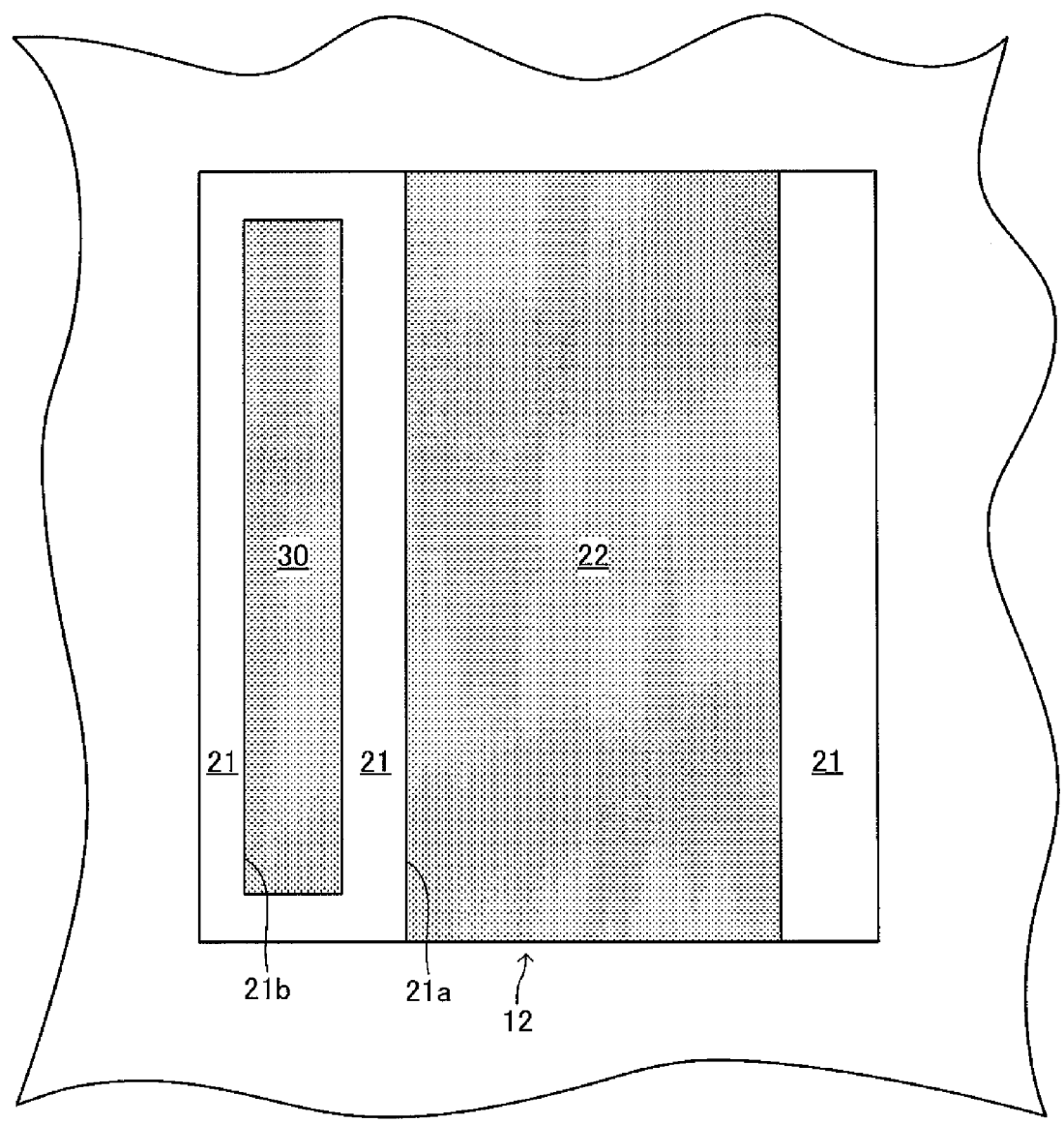
FIG. 19 is a plane view illustrating states of a fuel electrode and an interconnector embedded in the corresponding recesses of a support substrate illustrated in FIG. 18.

In the embodiment, moreover, in the SOFC to be connected with the "connected body," the fuel electrode 20 is formed (laminated) on the outer surface (flat surface) of the flat-plate-like support substrate 10 and the interconnector 30 is formed (laminated) on the outer surface (flat surface) of the fuel electrode 20. As illustrated in FIGS. 17 to 19, however, the fuel electrode 20 may be embedded in a recess (see FIG. 17) formed in the outer surface of the support substrate 10 and the interconnector 30 may be embedded in a recess formed in the outer surface of the fuel electrode 20. Hereinafter, major differences of the SOFC illustrated in each of FIGS. 17 to 19 from the SOFC used in the embodiment are briefly described.

In the embodiments illustrated in FIGS. 17 to 19, a plurality of recesses 12 are formed on the main surfaces (upper and lower surfaces) of the support substrate 10 at predetermined intervals along the longitudinal direction. Each of the recesses 12 is a rectangular-parallelepiped-like depression defined by a bottom wall formed of the material for the support substrate 10 and side walls (two side walls along the longitudinal direction and two side walls along the width direction) entirely formed of the material for the support substrate 10 arranged in a circumferentially closed manner. The fuel-electrode current-collecting portions 21 are embedded entirely in (filled into) the recesses 12. Thus, each of the fuel-electrode current-collecting portions 21 has a rectangular parallelepiped shape.

Each of the fuel-electrode current-collecting portions 21 has a recess 21a formed on its upper surface (outer surface). Each of the recesses 21a is a rectangular-parallelepiped-like depression defined by a bottom wall formed of the material for the fuel-electrode current-collecting portion 21 and side walls (two side walls along the longitudinal direction and two side walls along the width direction) arranged in a circumferentially closed manner. Among the side walls arranged in a circumferentially closed manner, the two side walls along the longitudinal direction are formed of the material for the support substrate 10, and the two side walls along the width direction are formed of the material for the fuel-electrode current-collecting portion 21.

The fuel-electrode active portions 22 are embedded entirely in (filled into) the respective recesses 21a. Thus, each of the fuel-electrode active portions 22 has a rectangular parallelepiped shape. The fuel electrode 20 includes the fuel-electrode current-collecting portion 21 and the fuel-electrode active portion 22. The fuel electrode 20 (the fuel-electrode current-collecting portion 21 and the fuel-electrode active portion 22) is a sintered body formed of a porous material having electron conductivity. Two side surfaces along the width direction and the bottom surface of each of the fuel-electrode active portions 22 are, within the recess 21a, brought into contact with the fuel-electrode current-collecting portion 21.

On the upper surface (outer surface) of each of the fuel-electrode current-collecting portions 21, a recess 21b is formed in a region other than the recess 21a. Each of the recesses 21b is a rectangular-parallelepiped-like depression defined by a bottom wall formed of the material for the fuel-electrode current-collecting portion 21 and side walls (two side walls along the longitudinal direction and two side walls along the width direction) entirely formed of the material for the fuel-electrode current-collecting portion 21 and arranged in a circumferentially closed manner.

The interconnectors 30 are embedded in (filled into) the respective recesses 21b. Thus, each of the interconnectors 30 has a rectangular parallelepiped shape. The interconnector 30 is a sintered body formed of a dense material having electron conductivity. Four side walls (two side walls along the longitudinal direction and two side walls along the width direction) and the bottom surface of each of the interconnectors 30 are, within the recess 21b, brought into contact with the fuel-electrode current-collecting portion 21.

The upper surfaces (outer surfaces) of the fuel electrodes 20 (the fuel-electrode current-collecting portions 21 and the fuel-electrode active portions 22), the upper surfaces (outer surfaces) of the interconnectors 30, and the main surface of the support substrate 10 form a single plane (the same plane as the main surface of the support substrate 10 in the case where the recesses 12 are not formed). That is, no level difference exists among the upper surfaces of the fuel electrodes 20, the upper surfaces of the interconnectors 30, and the main surface of the support substrate 10.

The fuel-electrode active portion 22 may be formed of, for example, nickel oxide (NiO) and yttria-stabilized zirconia (YSZ) (8YSZ). Alternatively, the fuel-electrode active portion 22 may be formed of nickel oxide (NiO) and gadolinium-doped ceria (GDC). The fuel-electrode current-collecting portion 21 may be formed of, for example, nickel oxide (NiO) and yttria-stabilized zirconia (YSZ) (8YSZ). Alternatively, the fuel-electrode current-collecting portion 21 may be formed of nickel oxide (NiO) and yttria ($Y_2O_3$), or may be formed of nickel oxide (NiO) and calcia-stabilized zirconia (CSZ). The thickness of the fuel-electrode active portion 22 is 5 to 30 μm, and the thickness of the fuel-electrode current-collecting portion 21 (i.e., the depth of the recess 12) is 50 to 500 μm.

As described above, the fuel-electrode current-collecting portion 21 includes a substance having electron conductivity. The fuel-electrode active portion 22 includes a substance having electron conductivity and a substance having oxygen ion conductivity. The "volume ratio of a substance having oxygen ion conductivity relative to the total volume excluding pores" in the fuel-electrode active portion 22 is higher than the "volume ratio of a substance having oxygen ion conductivity relative to the total volume excluding pores" in the fuel-electrode current-collecting portion 21.

The interconnector 30 may be formed of, for example, lanthanum chromite ($LaCrO_3$). Alternatively, the interconnector 30 may be formed of strontium titanate (($Sr, La)TiO_3$). The thickness of the interconnector 30 is 10 to 100 μm.

The solid electrolyte film 40 covers the entire longitudinally extending outer surface of the support substrate 10 in which the fuel electrodes 20 and the interconnectors 30 are embedded in the respective recesses 12, except for surface regions corresponding to longitudinally central portions of a plurality of the interconnectors 30. The solid electrolyte film 40 is a sintered body formed of a dense material having ion conductivity and not having electron conductivity. The solid electrolyte film 40 may be formed of, for example, yttria-stabilized zirconia (YSZ) (8YSZ). Alternatively, the solid electrolyte film 40 may be formed of lanthanum gallate (LSGM). The thickness of the solid electrolyte film 40 is 3 to 50 μm.

That is, a dense film formed of the interconnectors 30 and the solid electrolyte film 40 covers the entire longitudinally extending outer surface of the support substrate 10 in which the fuel electrodes 20 are embedded in the respective recesses 12. The dense film exhibits a gas seal function of preventing the mixing of a fuel gas flowing through a space on the inside of the dense layer and air flowing through a space on the outside of the dense layer.

As illustrated in FIG. 18, in this embodiment, the solid electrolyte film 40 covers the upper surfaces of the fuel electrodes 20, longitudinally opposite end portions of the upper surfaces of the interconnectors 30, and the main surface of the support substrate 10. Meanwhile, as described above, no level difference exists among the upper surfaces of the fuel electrodes 20, the upper surfaces of the interconnectors 30, and the main surface of the support substrate 10. Thus, the solid electrolyte film 40 is flattened. As a result, as compared with the case where the solid electrolyte film 40 involves a level difference, the generation of a crack in the solid electrolyte film 40 due to stress concentration can be suppressed, whereby a deterioration in gas seal function of the solid electrolyte film 40 can be suppressed.

The air electrodes 60 are formed, via the respective reaction prevention films 50, on the respective upper surfaces of those portions of the solid electrolyte film 40 which are brought into contact with the fuel-electrode active portions 22. The reaction prevention film 50 is a sintered body formed of a dense material, and the air electrode 60 is a sintered body formed of a porous material having electron conductivity. As viewed from above, the reaction prevention film 50 and the air electrode 60 each have a rectangular shape substantially similar to that of the fuel-electrode active portion 22.

The reaction prevention film 50 may be formed of, for example, gadolinium-doped ceria (GDC=$(Ce, Gd)O_2$). The thickness of the reaction prevention film 50 is 3 to 50 μm. The air electrode 60 may be formed of, for example, lanthanum strontium cobalt ferrite (LSCF=$(La, Sr)(Co, Fe)O_3$). Alternatively, the air electrode 60 may be formed of lanthanum strontium ferrite (LSF=$(La, Sr)FeO_3$), lanthanum nickel ferrite (LNF=$La(Ni, Fe)O_3$), lanthanum strontium cobaltite (LSC=$(La, Sr)CoO_3$), or the like. Further, the air electrode 60 may be formed of two layers including a first layer (inner layer) formed of LSCF and a second layer (outer layer) formed of LSC. The thickness of the air electrode 60 is 10 to 100 μm.

It should be noted that the reason for using the reaction prevention film 50 as an intervening film is to suppress the occurrence of the phenomenon that, during SOFC production or in an operating SOFC, YSZ in the solid electrolyte film 40 and Sr in the air electrode 60 react with each other to form a reaction film having high electric resistance at the interface between the solid electrolyte film 40 and the air electrode 60.

In this case, a laminate of the fuel electrode 20, the solid electrolyte film 40, the reaction prevention film 50, and the air electrode 60 corresponds to the "power-generating element A" (see FIG. 18). That is, on the upper surface of the support substrate 10, a plurality of (in this embodiment, four) the power-generating elements A are disposed at predetermined intervals along the longitudinal direction.

In each pair of the adjacent power-generating elements A, A, the air-electrode current-collecting film 70 is formed on the upper surfaces of the air electrode 60, the solid electrolyte film 40, and the interconnector 30 in such a manner as to bridge the air electrode 60 of one (in FIG. 18, the left) power-generating element A and the interconnector 30 of the other (in FIG. 18, the right) power-generating element A. The air-electrode current-collecting film 70 is a sintered body formed of a porous material having electron conductivity. As viewed from above, the air-electrode current-collecting film 70 has a rectangular shape.

The air-electrode current-collecting film 70 may be formed of, for example, lanthanum strontium cobalt ferrite (LSCF=

(La, Sr)(Co, Fe)O$_3$). Alternatively, the air-electrode current-collecting film 70 may be formed of lanthanum strontium cobaltite (LSC=(La, Sr)CoO$_3$). Alternatively, the air-electrode current-collecting film 70 may be formed of silver (Ag) or a silver-palladium alloy (Ag—Pd). The thickness of the air-electrode current-collecting film 70 is 50 to 500 μm.

As described above, through formation of the air-electrode current-collecting films 70, in each pair of the adjacent power-generating elements A, A, the air electrode 60 of one (in FIG. 18, the left) power-generating element A and the fuel electrode 20 (particularly, the fuel-electrode current-collecting portion 21) of the other (in FIG. 18, the right) power-generating element A are electrically connected to each other via "the air-electrode current-collecting film 70 and the interconnector 30" having electron conductivity. As a result, a plurality of (in this embodiment, four) power-generating elements A disposed on the upper surface of the support substrate 10 are connected electrically in series. In this case, "the air-electrode current-collecting film 70 and the interconnector 30" having electron conductivity collectively correspond to the "electrical connection."

It should be noted that the interconnector 30 corresponds to the "first portion formed of a dense material" of the "electrical connection" and has a porosity of 10% or less. The air-electrode current-collecting film 70 corresponds to the "second portion formed of a porous material" of the "electrical connection" and has a porosity of 20 to 60%.

As described above, in the SOFC illustrated in each of FIGS. 17 to 19, each of a plurality of the recesses 12 adapted to allow the fuel electrodes 20 to be embedded therein has a side wall entirely formed of the material for the support substrate 10 arranged in a circumferentially closed manner. In other words, in the support substrate 10, frames which surround the respective recesses 12 are formed. Thus, this structure is unlikely to be deformed when the support substrate 10 is subjected to an external force.

Further, in a state in which members, such as the fuel electrodes 20 and the interconnectors 30, are tightly filled or embedded into the respective recesses 12 of the support substrate 10, the support substrate 10 and the embedded members are cosintered. Thus, there is yielded a sintered body having high connection strength between members and high reliability.

Further, each of the interconnectors 30 is embedded in the recess 21b formed on the outer surface of the fuel-electrode current-collection portion 21. As a result, four side walls (two side walls along the longitudinal direction and two side walls along the width direction) and the bottom surface of the rectangular-parallelepiped-like interconnector 30 are, within the recess 21b, brought into contact with the fuel-electrode current-collecting portion 21. Thus, as compared with the case of adopting a configuration in which each of the rectangular-parallelepiped-like interconnectors 30 is laminated on (brought into contact with) the outer plane of the fuel-electrode current-collecting portion 21, the area of the interface between the fuel electrode 20 (the current-collecting portion 21) and the interconnector 30 can be increased. Thus, electron conductivity between the fuel electrode 20 and the interconnector 30 can be increased, whereby the power output of the fuel cell can be increased.

Further, a plurality of the power-generating elements A are provided on each of the upper and lower surfaces of the flat-plate-like support substrate 10. Thus, as compared with the case where a plurality of the power-generating elements are provided on only one side of the support substrate, the number of the power-generating elements in the structure can be increased, whereby the power output of the fuel cell can be increased.

In addition, the solid electrolyte film 40 covers the outer surfaces of the fuel electrodes 20, longitudinally opposite end portions of the outer surfaces of the interconnectors 30, and the main surface of the support substrate 10. Meanwhile, no level difference exists among the outer surfaces of the fuel electrodes 20, the outer surfaces of the interconnectors 30, and the main surface of the support substrate 10. Thus, the solid electrolyte film 40 is flattened. As a result, as compared with the case where the solid electrolyte film 40 involves a level difference, the generation of a crack in the solid electrolyte film 40 due to stress concentration can be suppressed, whereby a deterioration in gas seal function of the solid electrolyte film 40 can be suppressed.

Figure 20:
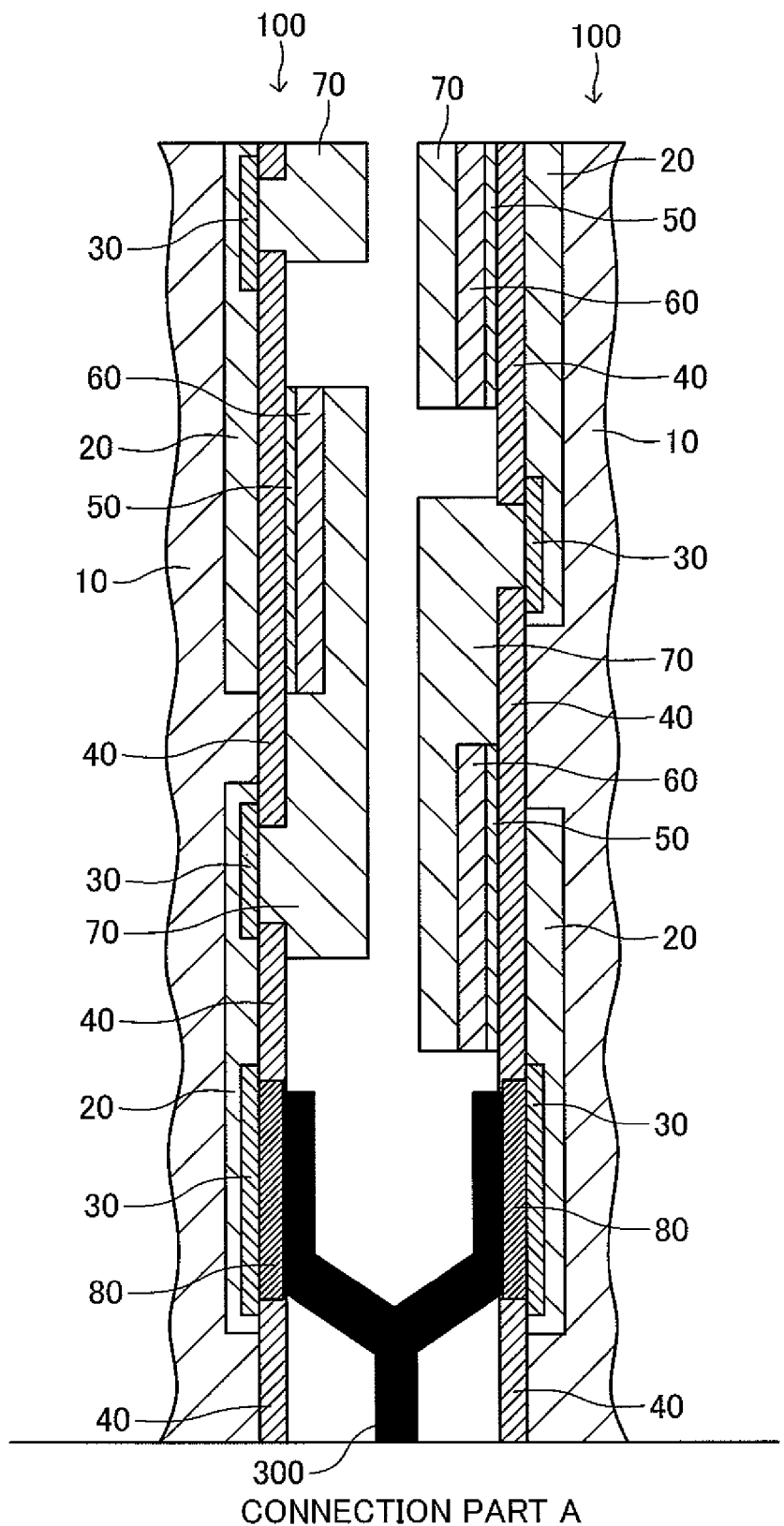
FIG. 20 is a view corresponding to FIG. 15 of a fuel cell that adopts the support substrate illustrated in FIG. 17.

FIG. 20 is a view corresponding to FIG. 15 for illustrating the "connected body" connecting between adjacent two SOFCs 100, 100 illustrated in each of FIGS. 17 to 19 with the connecting member 300 (see FIG. 2 for the entire shape) at the connection part A. The materials and the like for the connecting member 300, the interconnectors 30, 30, and the connecting material 80 to be used in the "connected body" are the same as the case of the configuration illustrated in FIG. 15 described above. Thus, the "connected body" illustrated in FIG. 20 can exhibit the same actions and effects as those of the "connected body" illustrated in FIG. 15 described above.

Figure 21:
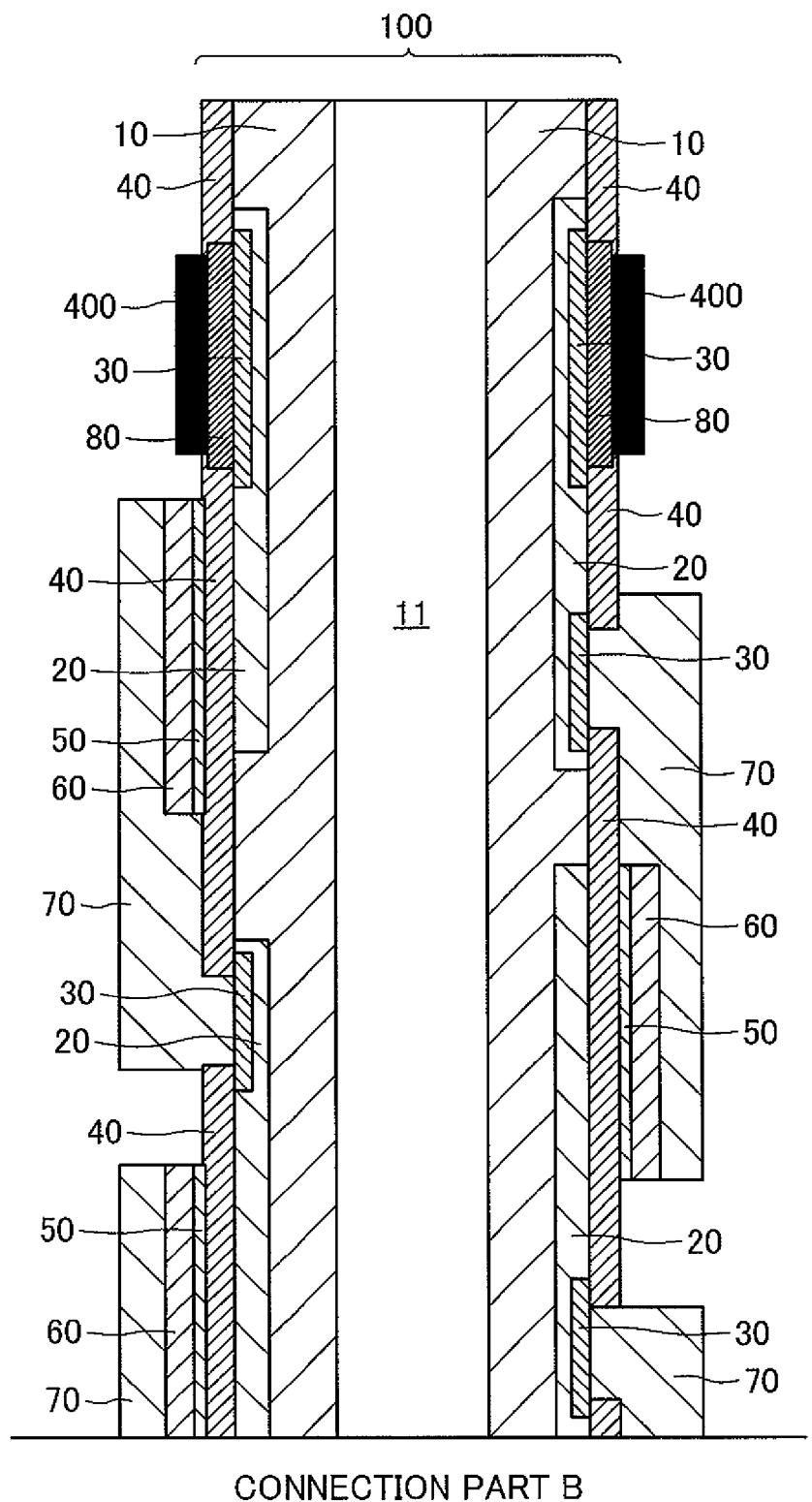
FIG. 21 is a view corresponding to FIG. 16 of the fuel cell that adopts the support substrate illustrated in FIG. 17.

Similarly, FIG. 21 is a view corresponding to FIG. 16 for illustrating the "connected body" connecting between both surfaces of one SOFC 100 illustrated in each of FIGS. 17 to 19 with the connecting member 400 (metallic band wound around the periphery of the cell 100) at the connection part B. The materials and the like for the connecting member 400, the interconnectors 30, 30, and the connecting material 80 to be used in the "connected body" are the same as the case of the configuration illustrated in FIG. 16 described above. Thus, the "connected body" illustrated in FIG. 21 can also exhibit the same actions and effects as those of the "connected body" illustrated in FIG. 16 described above.

What is claimed is:

1. A connected body connecting electrically between power generation parts of solid oxide fuel cells, comprising:
    a first power generation part of a first solid oxide fuel cell comprising a fuel electrode, an electrolyte film, and an air electrode;
    a second power generation part of a second solid oxide fuel cell comprising a fuel electrode, an electrolyte film, and an air electrode;
    a first conductive member which is electrically connected to the fuel electrode of the first power generation part and is formed of a dense conductive ceramics having electron conductivity; and
    a second conductive member which is electrically connected to the air electrode of the second power generation part and is formed of a dense conductive ceramics having electron conductivity,
    the first conductive member and the second conductive member being connected to each other with a connecting material having electron conductivity,
    wherein:
    the first power generation part and the first conductive member are provided on a porous plate-like support substrate of the first solid oxide fuel cell, the support substrate having formed therein a fuel gas flow channel for allowing a fuel gas to flow therethrough;
    the second power generation part and the second conductive member are provided on a porous plate-like support substrate of the second solid oxide fuel cell, the support substrate having formed therein a fuel gas flow channel for allowing a fuel gas to flow therethrough;

the first solid oxide fuel cell and the second solid oxide fuel cell are electrically connected to each other with the connecting material;

the first conductive member is connected to the fuel electrode of the first power generation part;

the second conductive member is connected to a conductive ceramics connected to the support substrate having provided thereon the second power generation part, the conductive ceramics being electrically connected to the air electrode of the second power generation part;

the fuel electrodes comprise a material having a first sintering temperature and the air electrodes comprise a material having a second sintering temperature, wherein the second sintering temperature of the air electrodes is lower than the first sintering temperature of the fuel electrodes, and wherein the conductive ceramics electrically connected to the air electrode comprises the same material as the fuel electrodes, and the air electrodes are sintered at a lower temperature than the fuel electrodes, and the conductive ceramics electrically connected to the air electrode is sintered at a higher temperature than the air electrodes.

2. A connected body according to claim 1, wherein each of the first conductive member and the second conductive member comprises a conductive ceramics having a porosity of 15% or less.

3. A connected body according to claim 2, wherein each of the first conductive member and the second conductive member comprises as the conductive ceramics a lanthanum chromite represented by a chemical formula of $La_{1-x}A_xCr_{1-y-z}B_yO_3$ where A represents at least one kind of element selected from the group consisting of Ca, Sr, and Ba, B represents at least one kind of element selected from the group consisting of Co, Ni, Mg, and Al, and relationships of $0.05 \leq x \leq 0.2$, $0.02 \leq y \leq 0.22$, and $0 \leq z \leq 0.05$ are satisfied.

4. A connected body according to claim 2, wherein each of the first conductive member and the second conductive member comprises as the conductive ceramics a titanium oxide represented by a chemical formula of $(A_{1-x},B_y)_{1-z}(Ti_{1-y},D_y)O_3$ where A represents at least one kind of element selected from the group consisting of alkaline earth elements, B represents at least one kind of element selected from the group consisting of Sc, Y, and lanthanoid elements, D represents at least one kind of element selected from the group consisting of fourth-period, fifth-period, and sixth-period transition metals and Al, Si, Zn, Ga, Ge, Sn, Sb, Pb, and Bi, and relationships $0 \leq x \leq 0.5$, $0 \leq y \leq 0.5$, and $-0.05 \leq z \leq 0.05$ are satisfied.

5. A connected body according to claim 1, wherein the connecting material having electron conductivity is formed of a sintered conductive ceramics material.

6. A connected body connecting electrically between power generation parts of solid oxide fuel cells, comprising:

a first power generation part of a first solid oxide fuel cell comprising a fuel electrode, an electrolyte film, and an air electrode;

a second power generation part of a second solid oxide fuel cell comprising a fuel electrode, an electrolyte film, and an air electrode;

a first conductive member which is electrically connected to the fuel electrode of the first power generation part and is formed of a dense conductive ceramics having electron conductivity;

a second conductive member which is electrically connected to the air electrode of the second power generation part and is formed of a dense conductive ceramics having electron conductivity; and a metallic connecting member for electrically connecting the first conductive member and the second conductive member, the connecting member and the first conductive member, and the connecting member and the second conductive member being connected to each other, respectively, with a connecting material having electron conductivity, wherein:

the first power generation part and the first conductive member are provided on a porous plate-like support substrate of the first solid oxide fuel cell, the support substrate having formed therein a fuel gas flow channel for allowing a fuel gas to flow therethrough;

the second power generation part and the second conductive member are provided on a porous plate-like support substrate of the second solid oxide fuel cell, the support substrate having formed therein a fuel gas flow channel for allowing a fuel gas to flow therethrough;

the first solid oxide fuel cell and the second solid oxide fuel cell are electrically connected to each other with the connecting member;

the first conductive member is connected to the fuel electrode of the first power generation part;

the second conductive member is connected to a conductive ceramics connected to the support substrate having provided thereon the second power generation part, the support substrate being electrically connected to the air electrode of the second power generation part;

the fuel electrodes comprise a material having a first sintering temperature and the air electrodes comprise a material having a second sintering temperature, wherein the second sintering temperature of the air electrodes is lower than the first sintering temperature of the fuel electrodes, and wherein the conductive ceramics electrically connected to the air electrode comprises the same material as the fuel electrodes, and the air electrodes are sintered at a lower temperature than the fuel electrodes, and the conductive ceramics electrically connected to the air electrode is sintered at a higher temperature than the air electrodes.

7. A connected body according to claim 6, wherein the connecting material having electron conductivity is formed of a sintered conductive ceramics material.

8. A connected body connecting electrically between power generation parts of solid oxide fuel cells, comprising:

a first power generation part of a solid oxide fuel cell comprising a fuel electrode, an electrolyte film, and an air electrode;

a second power generation part of a solid oxide fuel cell comprising a fuel electrode, an electrolyte film, and an air electrode;

a first conductive member which is electrically connected to the fuel electrode of the first power generation part and is formed of a dense conductive ceramics having electron conductivity; and a second conductive member which is electrically connected to the air electrode of the second power generation part and is formed of a dense conductive ceramics having electron conductivity, the first conductive member and the second conductive member being connected to each other with a connecting material having electron conductivity, wherein:

the first power generation part and the first conductive member are provided on a first surface side of a porous plate-like support substrate of the solid oxide fuel cell, the support substrate having formed therein a fuel gas flow channel for allowing a fuel gas to flow therethrough;

the second power generation part and the second conductive member are provided on a second surface side which is a side opposite to the first surface side of the support substrate;

a first surface side and a second surface side of the solid oxide fuel cell are electrically connected to each other with the connecting material;

the first conductive member is connected to the fuel electrode of the first power generation part;

the second conductive member is connected to a conductive ceramics connected to the support substrate having provided thereon the second power generation part, the conductive ceramics being electrically connected to the air electrode of the second power generation part;

the fuel electrodes comprise a material having a first sintering temperature and the air electrodes comprise a material having a second sintering temperature, wherein the second sintering temperature of the air electrodes is lower than the first sintering temperature of the fuel electrodes, and wherein the conductive ceramics electrically connected to the air electrode comprises the same material as the fuel electrodes, and the air electrodes are sintered at a lower temperature than the fuel electrodes, respectively, and the conductive ceramics electrically connected to the air electrode is sintered at a higher temperature than the air electrodes.

9. A connected body according to claim 8, wherein the connecting material having electron conductivity is formed of a sintered conductive ceramics material.

10. A connected body connecting electrically between power generation parts of solid oxide fuel cells, comprising:

a first power generation part of a solid oxide fuel cell comprising a fuel electrode, an electrolyte film, and an air electrode;

a second power generation part of a solid oxide fuel cell comprising a fuel electrode, an electrolyte film, and an air electrode;

a first conductive member which is electrically connected to the fuel electrode of the first power generation part and is formed of a dense conductive ceramics having electron conductivity;

a second conductive member which is electrically connected to the air electrode of the second power generation part and is formed of a dense conductive ceramics having electron conductivity; and a metallic connecting member for electrically connecting the first conductive member and the second conductive member, the connecting member and the first conductive member, and the connecting member and the second conductive member being connected to each other, respectively, with a connecting material having electron conductivity, wherein:

the first power generation part and the first conductive member are provided on a first surface side of a porous plate-like support substrate of the solid oxide fuel cell, the support substrate having formed therein a fuel gas flow channel for allowing a fuel gas to flow therethrough;

the second power generation part and the second conductive member are provided on a second surface side which is a side opposite to the first surface side of the support substrate;

a first surface side and a second surface side of the solid oxide fuel cell are electrically connected to each other with the connecting member;

the first conductive member is connected to the fuel electrode of the first power generation part;

the second conductive member is connected to a conductive ceramics connected to the support substrate having provided thereon the second power generation part, the conductive ceramics being electrically connected to the air electrode of the second power generation part;

the fuel electrodes comprise a material having a first sintering temperature and the air electrodes comprise a material having a second sintering temperature, wherein the second sintering temperature of the air electrodes is lower than the first sintering temperature of the fuel electrodes, and wherein the conductive ceramics electrically connected to the air electrode comprises the same material as the fuel electrodes, and the air electrodes are sintered at a lower temperature than the fuel electrodes, and the conductive ceramics electrically connected to the air electrode is sintered at a higher temperature than the air electrodes.

11. A connected body according to claim 10, wherein the connecting material having electron conductivity is formed of a sintered conductive ceramics material.

12. A connected body connecting electrically between power generation parts of solid oxide fuel cells, comprising:

a first power generation part of a first solid oxide fuel cell comprising a fuel electrode, an electrolyte film, and an air electrode;

a second power generation part of a second solid oxide fuel cell comprising a fuel electrode, an electrolyte film, and an air electrode;

the fuel electrodes comprise a material having a first sintering temperature and the air electrodes comprise a material having a second sintering temperature, wherein the second sintering temperature of the air electrodes is lower than the first sintering temperature of the fuel electrodes;

a first conductive member which is electrically connected to the fuel electrode of the first power generation part and is formed of a dense conductive ceramics having electron conductivity; and a second conductive member is connected to a conductive ceramics electrically connected to the air electrode of the second power generation part, wherein the conductive ceramics electrically connected to the air electrode comprises the same material as the fuel electrodes and the second conductive member is formed of a dense conductive ceramics having electron conductivity, the first conductive member and the second conductive member being connected to each other with a connecting material having electron conductivity, wherein:

the first power generation part and the first conductive member are provided on a porous flat-plate-like support substrate of the first solid oxide fuel cell, the support substrate having formed therein a fuel gas flow channel for allowing a fuel gas to flow therethrough;

the second power generation part and the second conductive member are provided on a porous flat-plate-like support substrate of the second solid oxide fuel cell, the support substrate having formed therein a fuel gas flow channel for allowing a fuel gas to flow therethrough;

the first solid oxide fuel cell and the second solid oxide fuel cell are electrically connected to each other with the connecting material;

outer surfaces of the support substrates of the first solid oxide fuel cell and the second solid oxide fuel cell comprise:

a plurality of power-generating elements provided at a plurality of positions, respectively, located apart from one another, each of the power-generating elements comprising at least a fuel electrode, an electrolyte film, and an air electrode laminated in the stated order; and a single or a plurality of electrical connections provided between a pair of or a plurality of pairs of adjacent power-generating elements and adapted to electrically connect the fuel electrode of one of the adjacent power-generating elements and the air electrode of another of the adjacent power-generating elements;

one of the plurality of power-generating elements provided on the support substrate of the first solid oxide fuel cell comprises the first power generation part, and one of the plurality of power-generating elements provided on the support substrate of the second solid oxide fuel cell comprises the second power generation part;

first recesses are formed on the outer surfaces of the flat-plate-like support substrates at the plurality of positions, respectively, each of the first recesses having a bottom wall formed of a material for the support substrate and a circumferentially closed side wall entirely formed of the material for the support substrate; and the fuel electrodes of the power-generating elements are embedded in the corresponding first recesses.

13. A connected body according to claim 12, wherein:

the first conductive member is connected to the fuel electrode of the first power generation part;

the second conductive member is connected to a conductive ceramics connected to the support substrate having provided thereon the second power generation part, the conductive ceramics being electrically connected to the air electrode of the second power generation part and being formed of the same material as the fuel electrodes; and the air electrodes are sintered at a lower temperature than the fuel electrodes, and the conductive ceramics formed of the same material as the fuel electrodes is sintered at a higher temperature than the air electrodes.

14. A connected body connecting electrically between power generation parts of solid oxide fuel cells, comprising:

a first power generation part of a first solid oxide fuel cell comprising a fuel electrode, an electrolyte film, and an air electrode;

a second power generation part of a second solid oxide fuel cell comprising a fuel electrode, an electrolyte film, and an air electrode;

the fuel electrodes comprise a material having a first sintering temperature and the air electrodes comprise a material having a second sintering temperature, wherein the second sintering temperature of the air electrodes is lower than the first sintering temperature of the fuel electrodes;

a first conductive member which is electrically connected to the fuel electrode of the first power generation part and is formed of a dense conductive ceramics having electron conductivity;

a second conductive member is connected to a conductive ceramics electrically connected to the air electrode of the second power generation part, wherein the conductive ceramics electrically connected to the air electrode comprises the same material as the fuel electrodes and the second conductive member is formed of a dense conductive ceramics having electron conductivity; and a metallic connecting member for electrically connecting the first conductive member and the second conductive member, the connecting member and the first conductive member, and the connecting member and the second conductive member being connected to each other, respectively, with a connecting material having electron conductivity, wherein:

the first power generation part and the first conductive member are provided on a porous flat-plate-like support substrate of the first solid oxide fuel cell, the support substrate having formed therein a fuel gas flow channel for allowing a fuel gas to flow therethrough;

the second power generation part and the second conductive member are provided on a porous flat-plate-like support substrate of the second solid oxide fuel cell, the support substrate having formed therein a fuel gas flow channel for allowing a fuel gas to flow therethrough;

the first solid oxide fuel cell and the second solid oxide fuel cell are electrically connected to each other with the connecting member;

outer surfaces of the support substrates of the first solid oxide fuel cell and the second solid oxide fuel cell comprise:

a plurality of power-generating elements provided at a plurality of positions, respectively, located apart from one another, each of the power-generating elements comprising at least a fuel electrode, an electrolyte film, and an air electrode laminated in the stated order; and a single or a plurality of electrical connections provided between a pair of or a plurality of pairs of adjacent power-generating elements and adapted to electrically connect the fuel electrode of one of the adjacent power-generating elements and the air electrode of another of the adjacent power-generating elements;

one of the plurality of power-generating elements provided on the support substrate of the first solid oxide fuel cell comprises the first power generation part, and one of the plurality of power-generating elements provided on the support substrate of the second solid oxide fuel cell comprises the second power generation part;

first recesses are formed on the outer surfaces of the flat-plate-like support substrates at the plurality of positions, respectively, each of the first recesses having a bottom wall formed of a material for the support substrate and a circumferentially closed side wall entirely formed of the material for the support substrate; and the fuel electrodes of the power-generating elements are embedded in the corresponding first recesses.

15. A connected body connecting electrically between power generation parts of solid oxide fuel cells, comprising:

a first power generation part of a solid oxide fuel cell comprising a fuel electrode, an electrolyte film, and an air electrode;

a second power generation part of a solid oxide fuel cell comprising a fuel electrode, an electrolyte film, and an air electrode;

the fuel electrodes comprise a material having a first sintering temperature and the air electrodes comprise a material having a second sintering temperature, wherein the second sintering temperature of the air electrodes is lower than the first sintering temperature of the fuel electrodes;

a first conductive member which is electrically connected to the fuel electrode of the first power generation part and is formed of a dense conductive ceramics having electron conductivity, and a second conductive member is connected to a conductive ceramics electrically connected to the air electrode of the second power generation part, wherein the conductive member electrically connected to the air electrode comprises the same material as the fuel electrodes and the second conductive member is formed of a dense conductive ceramics having electron conductivity, the first conductive member and the second conductive member being connected to each other with a connecting material having electron conductivity, wherein:

the first power generation part and the first conductive member are provided on a first surface side of a porous flat-plate-like support substrate of the solid oxide fuel cell, the support substrate having formed therein a fuel gas flow channel for allowing a fuel gas to flow therethrough;

the second power generation part and the second conductive member are provided on a second surface side which is a side opposite to the first surface side of the support substrate;

a first surface side and a second surface side of the solid oxide fuel cell are electrically connected to each other with the connecting material;

both outer surfaces of the support substrate of the solid oxide fuel cell comprise:

a plurality of power-generating elements provided at a plurality of positions, respectively, located apart from one another, each of the power-generating elements comprising at least a fuel electrode, an electrolyte film, and an air electrode laminated in the stated order; and a single or a plurality of electrical connections provided between a pair of or a plurality of pairs of adjacent power-generating elements and adapted to electrically connect the fuel electrode of one of the adjacent power-generating elements and the air electrode of another of the adjacent power-generating elements;

one of the plurality of power-generating elements provided on one of the both outer surfaces comprises the first power generation part, and one of the plurality of power-generating elements provided on another of the both outer surfaces comprises the second power generation part;

first recesses are formed on the outer surfaces of the flat-plate-like support substrates at the plurality of positions, respectively, each of the first recesses having a bottom wall formed of a material for the support substrate and a circumferentially closed side wall entirely formed of the material for the support substrate; and the fuel electrodes of the power-generating elements are embedded in the corresponding first recesses.

16. A connected body connecting electrically between power generation parts of solid oxide fuel cells, comprising:

a first power generation part of a solid oxide fuel cell comprising a fuel electrode, an electrolyte film, and an air electrode;

a second power generation part of a solid oxide fuel cell comprising a fuel electrode, an electrolyte film, and an air electrode;

the fuel electrodes comprise a material having a first sintering temperature and the air electrodes comprise a material having a second sintering temperature, wherein the second sintering temperature of the air electrodes is lower than the first sintering temperature of the fuel electrodes;

a first conductive member which is electrically connected to the fuel electrode of the first power generation part and is formed of a dense conductive ceramics having electron conductivity; and a second conductive member is connected to a conductive ceramics electrically connected to the air electrode of the second power generation part, wherein the conductive ceramics electrically connected to the air electrode comprises the same material as the fuel electrodes and the second conductive member is formed of a dense conductive ceramics having electron conductivity; and a metallic connecting member for electrically connecting the first conductive member and the second conductive member, the connecting member and the first conductive member, and the connecting member and the second conductive member being connected to each other, respectively, with a connecting material having electron conductivity, wherein:

the first power generation part and the first conductive member are provided on a first surface side of a porous flat-plate-like support substrate of the solid oxide fuel cell, the support substrate having formed therein a fuel gas flow channel for allowing a fuel gas to flow therethrough;

the second power generation part and the second conductive member are provided on a second surface side which is a side opposite to the first surface side of the support substrate;

a first surface side and a second surface side of the solid oxide fuel cell are electrically connected to each other with the connecting member;

both outer surfaces of the support substrate of the solid oxide fuel cell comprise:

a plurality of power-generating elements provided at a plurality of positions, respectively, located apart from one another, each of the power-generating elements comprising at least a fuel electrode, an electrolyte film, and an air electrode laminated in the stated order; and a single or a plurality of electrical connections provided between a pair of or a plurality of pairs of adjacent power-generating elements and adapted to electrically connect the fuel electrode of one of the adjacent power-generating elements and the air electrode of another of the adjacent power-generating elements;

one of the plurality of power-generating elements provided on one of the both outer surfaces comprises the first power generation part, and one of the plurality of power-generating elements provided on another of the both outer surfaces comprises the second power generation part;

first recesses are formed on the outer surfaces of the flat-plate-like support substrates at the plurality of positions, respectively, each of the first recesses having a bottom wall formed of a material for the support substrate and a circumferentially closed side wall entirely formed of the material for the support substrate; and the fuel electrodes of the power-generating elements are embedded in the corresponding first recesses.

17. A connected body according to claim 12, wherein:

each of the electrical connections comprises a first portion formed of a dense material and a second portion connected to the first portion and formed of a porous material;

second recesses are formed on outer surfaces of the embedded fuel electrodes, each of the second recesses having a bottom wall formed of a material for the fuel electrodes and a circumferentially closed side wall entirely formed of the material for the fuel electrodes; and the first portions of the electrical connections are embedded in the corresponding second recesses.

* * * * *